United States Patent
Kehrloesser et al.

(10) Patent No.: US 10,377,914 B2
(45) Date of Patent: Aug. 13, 2019

(54) METHOD FOR PRODUCING EMULSION POLYMERISATES

(71) Applicant: BASF SE, Ludwigshafen (DE)

(72) Inventors: Daniel Kehrloesser, Mannheim (DE); Joost Leswin, Mannheim (DE); Daniel Specker, Mannheim (DE); Konrad Roschmann, Ladenburg (DE); Matthias Gerst, Maikammer (DE); Harm Wiese, Laudenbach (DE)

(73) Assignee: BASF SE, Ludwigshafen (DE)

( * ) Notice: Subject to any disclaimer, the term of this patent is extended or adjusted under 35 U.S.C. 154(b) by 382 days.

(21) Appl. No.: 14/913,555

(22) PCT Filed: Aug. 13, 2014

(86) PCT No.: PCT/EP2014/067332
§ 371 (c)(1),
(2) Date: Feb. 22, 2016

(87) PCT Pub. No.: WO2015/024835
PCT Pub. Date: Feb. 26, 2015

(65) Prior Publication Data
US 2016/0208128 A1 Jul. 21, 2016

(30) Foreign Application Priority Data
Aug. 22, 2013 (EP) .................................. 13181404

(51) Int. Cl.
| | |
|---|---|
| *C09D 133/12* | (2006.01) |
| *C08F 265/06* | (2006.01) |
| *C09D 125/14* | (2006.01) |
| *C09D 7/42* | (2018.01) |

(52) U.S. Cl.
CPC .............. *C09D 133/12* (2013.01); *C09D 7/42* (2018.01); *C09D 125/14* (2013.01); *C08F 265/06* (2013.01)

(58) Field of Classification Search
CPC .................................................... C08F 265/06
See application file for complete search history.

(56) References Cited

U.S. PATENT DOCUMENTS

| | | | | |
|---|---|---|---|---|
| 5,216,070 | A | * 6/1993 | Plochocka | ............... C08F 2/32 524/109 |
| 8,013,081 | B2 | 9/2011 | Heuts et al. | |
| 2010/0055446 | A1 | 3/2010 | Seyffer et al. | |
| 2012/0129965 | A1 | 5/2012 | Tuchbreiter et al. | |
| 2012/0245240 | A1 | 9/2012 | Perez et al. | |

FOREIGN PATENT DOCUMENTS

| | | |
|---|---|---|
| DE | 25 01 123 A1 | 7/1976 |
| DE | 102 11 664 A1 | 10/2003 |
| DE | 10 2004 026 904 A1 | 12/2005 |
| DE | 10 2005 009 1 | 8/2006 |
| EP | 0 915 108 A1 | 5/1999 |
| EP | 1 141 083 A2 | 10/2001 |
| EP | 1 904 544 A1 | 4/2008 |
| EP | 2 511 312 A1 | 10/2012 |
| JP | 2005-187709 A | 7/2005 |
| WO | WO 96/19537 A1 | 6/1996 |
| WO | WO 99/16810 A1 | 4/1999 |
| WO | WO 00/37532 A2 | 6/2000 |
| WO | WO 00/56802 A1 | 9/2000 |
| WO | WO 03/054204 A1 | 7/2003 |
| WO | WO 03/062306 A1 | 7/2003 |
| WO | WO 03/093343 A1 | 11/2003 |
| WO | WO 2004/020503 A1 | 3/2004 |
| WO | WO 2005/026234 A1 | 3/2005 |
| WO | WO 2005/037893 A1 | 4/2005 |
| WO | WO 2007/006766 A1 | 1/2007 |
| WO | WO 2008/071687 A1 | 6/2008 |
| WO | WO 2011/009875 A1 | 1/2011 |

OTHER PUBLICATIONS

International Search Report dated Oct. 24, 2014 in PCT/EP2014/067332.

* cited by examiner

*Primary Examiner* — Vickey Nerangis
(74) *Attorney, Agent, or Firm* — Oblon, McClelland, Maier & Neustadt, L.L.P.

(57) ABSTRACT

The present invention relates to a method of producing emulsion polymer particles having a core-shell structure wherein at least one polyalkylene oxide containing additive is used in the core, and also to their use in paints, paper coatings, foams, crop protection agents, liquid inks and cosmetic compositions.

17 Claims, No Drawings

METHOD FOR PRODUCING EMULSION POLYMERISATES

The present invention relates to a method of producing emulsion polymer particles having a core-shell structure wherein at least one nonionic polyalkylene oxide containing additive is used in the core, and also to their use in paints, paper coatings, foams, crop protection agents, liquid inks and cosmetic compositions.

Hollow organic particles are a special kind of core-shell particles which, in dried form, consist of an air-filled void surrounded by a hard sheath. Owing to this construction, they have the special property of scattering light, explaining their use as white pigment in paints, paper coatings and cosmetic compositions, for example suncreams. When used therein they replace part of the inorganic white pigment titanium dioxide and also boost the effect of the remaining $TiO_2$.

C. J. McDonald and M. J. Devon, in Advances in Colloid and Interface Science 2002, 99, 181-213, describe various ways of forming these hollow particles such as inter alia swelling with organic solvents or propellants, encapsulation of hydrocarbons or approaches based on W/O/W emulsions. However, the procedure which is preferred for ecological as well as economic reasons is that of osmotically swelling specific core-shell particles.

EP 0 915 108, EP 1 904 544 and EP 2 511 312 and also U.S. Pat. No. 8,013,081 describe this process in outline. JP 2005-187709 also describes such a process. However, the prior art is disadvantageous in that the hollow particles described, which have a thin shell, tend to collapse on drying unless more than 10 wt % of crosslinker, based on the weight of the outermost shell, is used in the outermost shell. This disadvantage of the prior art was overcome by the use of polyalkylene oxide containing nonionic additives in the core, which ensure the structural integrity of the shell as the particles dry. The polymers obtained by the method of the present invention exhibit a distinctly improved scattering efficiency as a result.

The problem addressed by the present invention was that of developing a production method for emulsion polymer particles, in particular for hollow organic particles having an improved whiteness compared with the prior art.

The problem addressed by the invention was solved by the hereinbelow described method:

A method of producing emulsion polymer particles by producing a multistaged emulsion polymer by sequential polymerization (i) wherein the multistaged emulsion polymer comprises at least a core stage polymer and a sheath stage polymer, and the core stage polymer comprises by way of polymerized units from 5 to 99.5 wt %, based on the weight of the core stage polymer, of a hydrophilic ethylenically unsaturated monomer, and from 0 to 95 wt %, based on the weight of the core stage polymer, of at least one nonionic ethylenically unsaturated monomer as well as 0.5 to 20 wt %, preferably 1 to 5 wt %, of at least one nonionic polyalkylene oxide containing additive, based on the weight of the core stage polymer, and wherein the sheath stage polymer comprises by way of polymerized units not less than 50 wt % of a nonionic ethylenically unsaturated monomer, and also ii) neutralizing the resultant particles with at least one base up to a pH of not less than 7.5 and also optionally polymerizing further shells comprising one or more than one nonionic ethylenically unsaturated monomer.

The present invention further provides a method of producing emulsion polymer particles by producing a multistaged emulsion polymer by sequential polymerization (i) wherein the multistaged emulsion polymer comprises at least a core stage polymer and a sheath stage polymer, and the core stage polymer comprises by way of polymerized units from 5 to 99.5 wt %, based on the weight of the core stage polymer, of a hydrophilic ethylenically unsaturated monomer, and from 0 to 95 wt %, based on the weight of the core stage polymer, of at least one nonionic ethylenically unsaturated monomer as well as 0.5 to 20 wt %, preferably 1 to 5 wt %, of at least one nonionic polyalkylene oxide additive, based on the weight of the core stage polymer, and wherein the sheath stage polymer comprises by way of polymerized units not less than 50 wt % of a nonionic ethylenically unsaturated monomer, and also ii) neutralizing the resultant particles with at least one base up to a pH of not less than 7.5, in the presence of not less than 0.5 wt % of a nonionic ethylenically unsaturated plasticizing monomer, based on the overall weight of the multistage emulsion polymer, iii) subsequently polymerizing the nonionic ethylenically unsaturated plasticizing monomer optionally by further admixing one or more nonionic ethylenically unsaturated monomers iv) and also optionally polymerizing further shells comprising one or more than one nonionic ethylenically unsaturated monomer.

The present invention further provides the polymer particles obtainable by the two methods.

The present invention further provides for the use of the emulsion polymers obtainable according to the present invention in paints, paper coatings, foams, crop protection agents, liquid inks or cosmetic compositions, and also paints, paper, foams, crop protection agents, liquid inks or cosmetic compositions comprising the emulsion polymers obtainable according to the present invention. The present invention still further provides the method of using the polyalkylene oxide additives in the manufacture of emulsion polymer particles for organic hollow particles having improved whiteness.

One advantage of the invention is that the disclosed use of at least one nonionic polyalkylene oxide additive in the core ensures that, in relation to the prior art, the structural integrity of the shell is preserved during the drying of the particles without more than 10 wt % of a crosslinker, based on the weight of the outermost shell, having to be used in the outermost shell. Thinner shells can accordingly be produced as a result for the same solids content, leading to an increased number of particles, which is tantamount to the polymers in total having a larger overall voidage. This leads to a distinct improvement in whiteness and thus overcomes this disadvantage of the prior art.

The disclosed invention is a multistaged sequential emulsion polymerization. Sequential relates to the implementation of the individual stages in that each individual stage may also be constructed of two or more sequential steps.

The core stage polymer can comprise not only a seed but also a swell-seed, in which case the seed comprises not less than 0.5 to 20 wt %, preferably 1 to 5 wt %, of at least one nonionic polyalkylene oxide additive, based on the overall weight of the core stage polymer, and this seed is subsequently reacted with a monomer mixture, comprising 5 to 99.5 wt %, preferably 60 to 80 wt %, of one or more than one nonionic ethylenically unsaturated monomer, 0 to 95 wt %, preferably 20 to 40 wt %, of one or more than one ethylenically unsaturated hydrophilic monomer, each based on the overall weight of the core stage polymer to form the swell-seed.

The term "seed" refers to an aqueous polymeric dispersion which is used at the start of the multistaged polymerization and is the product of an emulsion polymerization, or to an aqueous polymeric dispersion which is present at the end of one of the polymerization stages for producing the hollow particle dispersion, except the last stage.

The seed used at the start of the polymerization of the first stage may be formed both in a separate step beforehand and in situ.

The seed preferably comprises polymers selected from the group consisting of styrene, acrylic acid, methacrylic acid, esters of acrylic acid and methacrylic acid or copolymers thereof, as well as one or more than one nonionic polyalkylene oxide additive.

The average particle size of the seed polymer in the unswollen state is in the range from 20 to 100 nm.

The polyalkylene oxide nonionic additives are polysiloxane-polyalkylene oxide copolymers, such as polysiloxane-polyalkylene oxide graft copolymers of comb structure, polysiloxane-polyalkylene oxide graft copolymers of α,ω structure, polysiloxane-polyalkylene oxide graft copolymers having ABA or BAB block structures or further sequences of polyalkylene oxide polysiloxane blocks, branched polysiloxane-polyalkylene oxide copolymers, polysiloxane-polyalkylene oxide graft copolymers having polyester, (fluorinated) (poly)alkyl, polyacrylate side chains; copolymers of propylene oxide, butylene oxide or styrene oxide and ethylene oxide, block copolymers of propylene oxide and ethylene oxide, polyalkylene oxide-poly(meth)acrylate copolymers, polyalkylene oxide-(poly)alkyl copolymers, poly(alkylene oxide)-poly((meth)acrylate) block copolymer, fluorinated alkyl ester polyalkylene oxides and polyalkoxylates and highly branched polyalkylene oxides, preferably polysiloxane-polyalkylene oxide graft copolymers of comb structure, or mixtures thereof.

In the context of the structures hereinbelow, the expression alkyl comprises straight-chain and branched alkyl groups. Suitable short-chain alkyl groups include, for example, straight-chain or branched $C_1$-$C_7$alkyl, preferably $C_1$-$C_6$-alkyl and more preferably $C_1$-$C_4$-alkyl groups. These include, in particular, methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable long-chain $C_8$-$C_{32}$-alkyl groups are straight-chain and branched alkyl groups. These preferably comprise predominantly linear alkyl moieties of the type that also occurs in natural or synthetic fatty acids and fatty alcohols as well as oxo process alcohols. These include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, etc. The expression alkyl comprises substituted and unsubstituted alkyl moieties.

The above remarks regarding alkyl also hold for the alkyl portions in alkyl esters.

Polysiloxane-polyalkylene oxide graft copolymers of comb structure are, for example, polymers of general formula (I):

$$R_9-\underset{\underset{R_8}{|}}{\overset{\overset{R_1}{|}}{Si}}-O-(\underset{\underset{R_7}{|}}{\overset{\overset{R_2}{|}}{Si}}-O)_n-(\underset{\underset{X}{|}}{\overset{\overset{R_3}{|}}{Si}}-O)_m-\underset{\underset{R_6}{|}}{\overset{\overset{R_4}{|}}{Si}}-R_5$$ (I)

where $R_1$ to $R_9$ are each independently H or alkyl or OH or O-alkyl or allyl ($-(CH_2)-CH=CH_2$) or O-allyl ($-O-(CH_2)-CH=CH_2$) or phenyl or alkyl ester; $R_1$ to $R_9$ are each preferably methyl.

n is 0-1000 preferably 0-500 more preferably 1-100, m is 1-100 preferably 1-50 more preferably 1-10.

X has the following structure (Ia):

$$\{-(CH)_t(CHR_{15})_u(CHR_{16})_v-[O-(CHR_{13})_w(CHR_{14})_x]_o-[O-(CHR_{11})_y(CHR_{12})_z]_p-R_{10}$$ (Ia)

$R_{10}$ may be OH or O-alkyl or O-allyl or O-phenyl or an alkyl ester, preferably $R_{10}$ is OH, O-methyl or O-butyl.

$R_{11}$, $R_{13}$ or $R_{15}$ may each independently be H or alkyl or phenyl, preferably $R_{11}$, $R_{13}$ or $R_{13}$ are each H.

$R_{12}$, $R_{14}$ and $R_{16}$ may each independently be H or alkyl or phenyl, preferably $R_{12}$, $R_{14}$ and $R_{16}$ are each H or methyl.

o is 0-100 preferably 0-50 more preferably 10-40, p is 1-100 preferably 1-50 more preferably 10-40, t is 0 or 2 preferably 0, u is 0-10 preferably 0-6 more preferably 3, v is 0-10 preferably 0-6 more preferably 0, w, x, y and z may each independently be 1-10, preferably 1-5, more preferably 1 and the same.

Polysiloxane-polyalkylene oxide graft copolymers of of α,ω structure are, for example, polymers of general formula (II):

$$Y-\underset{\underset{R_6}{|}}{\overset{\overset{R_1}{|}}{Si}}-O-(\underset{\underset{R_5}{|}}{\overset{\overset{R_2}{|}}{Si}}-O)_n-\underset{\underset{R_4}{|}}{\overset{\overset{R_3}{|}}{Si}}-X$$ (II)

$R_1$ to $R_6$ may each independently be H or alkyl or OH or O-alkyl or allyl ($-(CH_2)-CH=CH_2$) or O-allyl ($-O-(CH_2)-CH=CH_2$) or phenyl or alkyl ester; $R_1$ to $R_6$ are each preferably methyl.

n is 0-1000 preferably 0-500 more preferably 1-100.

X and Y may each independently have the following structure (formula IIa):

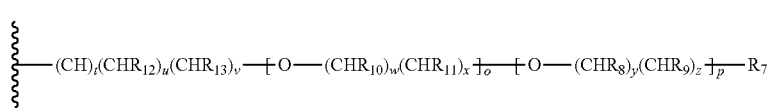

(IIa)

$R_7$ may be OH or O-alkyl or O-allyl (—O—(CH$_2$)—CH=CH$_2$) or O-phenyl or alkyl ester, preferably $R_7$ is OH, O-methyl or O-butyl.

$R_8$, $R_{10}$ and $R_{12}$ may each independently be H or alkyl or phenyl, preferably $R_8$, $R_{10}$ and $R_{12}$ are each H.

$R_9$, $R_{11}$ and $R_{13}$ may each independently be H or alkyl or phenyl, preferably $R_9$, $R_{11}$ and $R_{13}$ are each H or methyl.

o is 0-100 preferably 0-50 more preferably 10-40,
p is 1-100 preferably 1-50 more preferably 10-40,
t is 0 or 2 preferably 0,
u is 0-10 preferably 0-6 more preferably 3,
v is 0-10 preferably 0-6 more preferably 0,
w, x, y and z may each independently be 1-10, preferably 1-5, more preferably 1 and the same.

ABA or BAB block structures or further sequences of polyalkylene oxide polysiloxane blocks refer, for example, to polymers of the general structure:

ABA; BAB; ABAB; BABA; ABABA; BABAB, AABB, BBAA; AABBAA, BBAABB and further regular sequences of the repeat units A and B, of which the repeat unit A may for example be described using the following general formula (III):

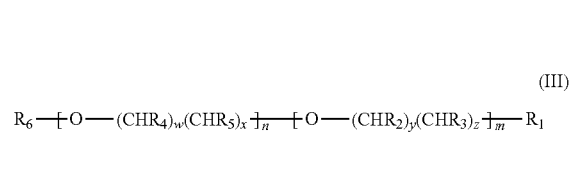

(III)

$R_1$ and $R_6$ may each independently be repeat unit A or B or H, alkyl or OH or O-alkyl or allyl (—(CH$_2$)—CH=CH$_2$) or O-allyl (—O—(CH$_2$)—CH=CH$_2$) or phenyl or alkyl ester.

$R_2$ and $R_4$ may each independently be H or alkyl or phenyl, preferably $R_2$ and $R_4$ are each H.

$R_3$ and $R_5$ may each independently be H or alkyl or phenyl, preferably $R_3$ and $R_5$ are each H or methyl.

n is 0-100 preferably 0-50,
m is 1-100 preferably 1-50,
w, x, y and z may each independently be 1-10, preferably 1-5 and more preferably 1 and the same.

The repeat unit B may for example be described using the following general formula (IIIa):

$R_7$ and $R_{18}$ may each independently be repeat unit A or B or H, alkyl or OH or O-alkyl or allyl (—(CH$_2$)—CH=CH$_2$) or O-allyl (—O—(CH$_2$)—CH=CH$_2$), phenyl or an alkyl ester.

$R_{10}$ to $R_{15}$ may each independently be H or alkyl or OH or O-alkyl or allyl (—(CH$_2$)—CH=CH$_2$) or O-allyl (—O—(CH$_2$)—CH=CH$_2$) or phenyl or an alkyl ester; preferably $R_{10}$ to $R_{15}$ are each methyl.

$R_9$ and $R_{16}$ may each independently be H or alkyl or phenyl, preferably $R_9$ and $R_{16}$ are each H.

$R_8$ and $R_{17}$ may each independently be H or alkyl or phenyl, preferably $R_8$ and $R_{17}$ are each H or methyl.

o may be 1-1000 preferably 1-100,
t and u are each 0 or 2 preferably 0,
s and v are 0-10 preferably 0-6 more preferably 3,
p and r are 0-10 preferably 0-6 more preferably 0.

The repeat unit B may also be described using the following general formula (IIIb):

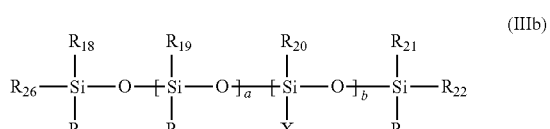

(IIIb)

$R_{22}$ and $R_{26}$ may each independently be repeat unit A or B or H or alkyl or OH or O-alkyl or allyl (—(CH$_2$)—CH=CH$_2$) or O-allyl (—O—(CH$_2$)—CH=CH$_2$) or phenyl or alkyl ester.

$R_{18}$ to $R_{21}$ and $R_{23}$ to $R_{25}$ may each independently be H or alkyl or OH or O-alkyl or allyl (—(CH$_2$)—CH=CH$_2$) or O-allyl (—O—(CH$_2$)—CH=CH$_2$) or phenyl or alkyl ester; preferably $R_{18}$ to $R_{21}$ and $R_{23}$ to $R_{25}$ are each methyl.

a is 0-1000 preferably 0-500 more preferably 1-100,
b is 1-100 preferably 1-50 more preferably 1-10,

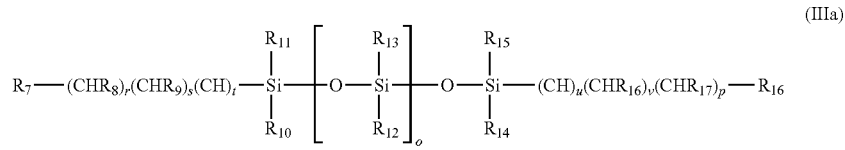

(IIIa)

X has the following structure (formula IIIc):

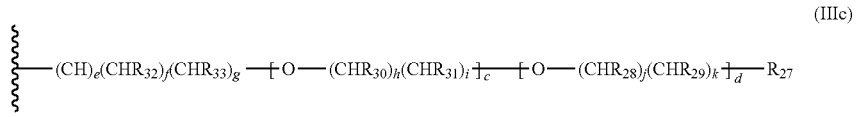
(IIIc)

$R_{27}$ may be OH or O-alkyl or O-allyl (—O—($CH_2$)—$CH=CH_2$) or O-phenyl or an alkyl ester, preferably $R_1$ is OH, O-methyl or O-butyl.

$R_{28}$, $R_{30}$ and $R_{32}$ may each independently be H or alkyl or phenyl, preferably $R_{28}$, $R_{30}$ and $R_{32}$ are each H.

$R_{29}$, $R_{31}$ and $R_{33}$ may each independently be H or alkyl or phenyl, preferably $R_{29}$, $R_{31}$ and $R_{33}$ are each H or methyl.

c is 0-100 preferably 0-50 more preferably 10-40, d is 1-100 preferably 1-50 more preferably 10-40, e is 0 or 2 preferably 0, f is 0-10 preferably 0-6 more preferably 3, g is 0-10 preferably 0-6 more preferably 0, h, i, j and k may each independently be 1-10, preferably 1-5 and more preferably 1 and the same.

Branched polysiloxane-polyalkylene oxide graft copolymers are, for example, polymers of general formula (IV) or (IVa):

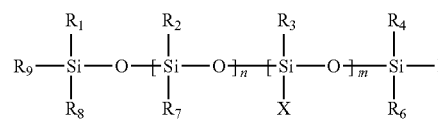
(IV)

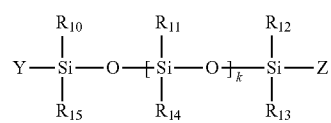
(IVa)

$R_1$ to $R_{15}$ may each independently be H or alkyl or OH or O-alkyl or allyl (—($CH_2$)—$CH=CH_2$) or O-allyl (—O—($CH_2$)—$CH=CH_2$) or phenyl or alkyl ester; preferably $R_1$ to $R_{15}$ are each methyl except that at least one of $R_1$ to $R_{15}$ is:

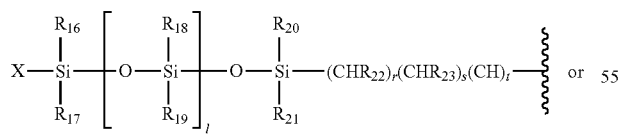
(IVb)

-continued

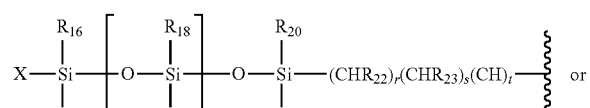
(IVc)

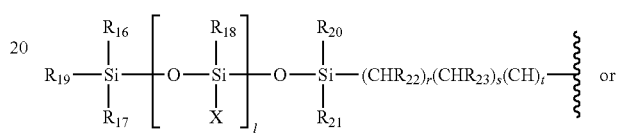
(IVd)

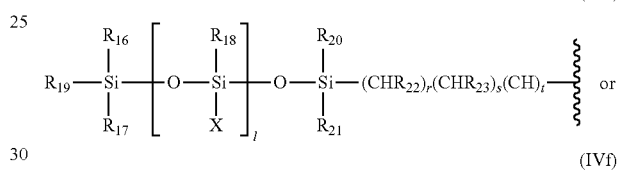
(IVe)

(IVf)

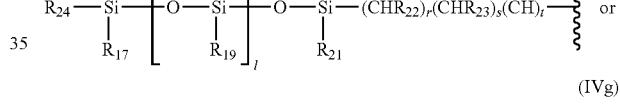
(IVg)

Where $R_{16}$ to $R_{21}$ and $R_{24}$ may each independently be H or alkyl or OH or O-alkyl or allyl (—($CH_2$)—$CH=CH_2$) or O-allyl (—O—($CH_2$)—$CH=CH_2$) or phenyl or alkyl ester; preferably $R_{16}$ to $R_{21}$ and $R_{24}$ are each methyl.

$R_{23}$ may at each occurrence independently be H or alkyl or phenyl; preferably $R_{23}$ is H.

$R_{22}$ may at each occurrence independently be H or alkyl or phenyl; preferably $R_{22}$ is H or methyl.

t is 0 or 2 preferably 0, s is 0-10 preferably 0-6, more preferably 3, r is 0-10 preferably 0-6, more preferably 0, l is 1-100 preferably 1-50 more preferably 1-10.

X, Y and Z may each independently have the following formula (IVh):

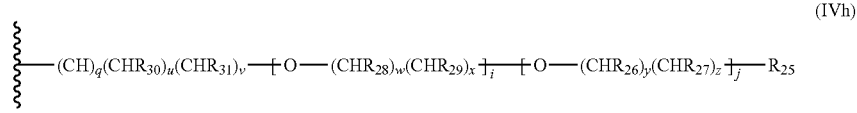
(IVh)

Where $R_{25}$ may be OH or O-alkyl or O-allyl (—O—$(CH_2)$—CH=$CH_2$) or O-phenyl or an alkyl ester; preferably $R_{25}$ is OH, O-methyl or O-butyl.

$R_{26}$, $R_{28}$ and $R_{30}$ may each independently be H or alkyl or phenyl; preferably $R_{26}$, $R_{28}$ and $R_{30}$ are each H.

$R_{27}$, $R_{29}$ and $R_{31}$ may each independently be H or alkyl or phenyl; preferably $R_{27}$, $R_{29}$ and $R_{31}$ are each H or methyl.

i is 0-100 preferably 0-50 more preferably 10-40,
j is 1-100 preferably 1-50 more preferably 10-40,
q is 0 or 2 preferably 0,
u is 0-10 preferably 0-6 more preferably 3,
v is 0-10 preferably 0-6 more preferably 0,
w, x, y and z may each independently be 1-10, preferably 1-5 and more preferably 1 and the same.
n is 0-1000 preferably 0-500 more preferably 1-100,
k is 0-1000 preferably 0-500 more preferably 1-100
m is 1-100 preferably 1-50 more preferably 1-10.

Polysiloxane-polyalkylene oxide graft copolymers having polyester, (fluorinated) (poly)alkyl, (fluorinated) polyacrylate side chains are, for example, polymers of general formula (V):

$$W—Si(R_1)(R_6)—O—[Si(R_2)(X)—O]_n—[Si(R_3)(Y)—O]_m—Si(R_4)(R_6)—Z \quad (V)$$

W, X, Y and Z may each independently be $$\{—(CH)_t(CHR_{12})_u(CHR_{13})_v—[O—(CHR_{10})_w(CHR_{11})_x]_o—[O—(CHR_8)_y(CHR_9)_z]_p—R_7 \quad (Va)$$

where $R_7$ may be OH or O-alkyl or O-allyl (—O—$(CH_2)$—CH=$CH_2$) or O-phenyl or an alkyl ester; preferably $R_7$ is OH, O-methyl or O-butyl;

$R_8$, $R_{10}$ and $R_{12}$ may each independently be H or alkyl or phenyl; preferably $R_8$, $R_{10}$ and $R_{12}$ are each H;

$R_9$, $R_{11}$ and $R_{13}$ may each independently be H or alkyl or phenyl; preferably $R_9$, $R_{11}$ and $R_{13}$ or methyl;

o is 0-100 preferably 0-50 more preferably 10-40;
p is 1-100 preferably 1-50 more preferably 10-40;
t is 0 or 2 preferably 0;
u is 0-10 preferably 0-6 more preferably 3;
v is 0-10 preferably 0-6 more preferably 0;
x, y and z may each independently be 1-10, preferably 1-5 and more preferably 1 and the same;

or $$\{—[O—(CR_{14}R_{15})_l—C(=O)]_k—R_{16} \quad (Vb)$$

where $R_{14}$ to $R_{16}$ may each independently be H or alkyl or OH or O-alkyl or allyl (—$(CH_2)$—CH=$CH_2$) or O-allyl (—O—$(CH_2)$—CH=$CH_2$);

l may be 1-20;
k may be 1-1000;

or $$\{—[C(R_{17})(R_{21})]_q—C(R_{18})(R_{20})—R_{19} \quad (Vc)$$

where $R_{17}$ to $R_{21}$ may each independently be H or F or alkyl or OH or O-alkyl or allyl (—$(CH_2)$—CH=$CH_2$) or O-allyl (—O—$(CH_2)$—CH=$CH_2$);

q may be 1-1000 preferably 1-100 more preferably 1-20;

or $$\{—[C(R_{22})(R_{23})—C(R_{24})(R_{25})(C(=O)OR_{26})]_r \quad (Vd)$$

where $R_{22}$ and $R_{23}$ may each independently be H or F;
where $R_{24}$ may be H or F or methyl;
where $R_{25}$ may be H or F or alkyl or OH or O-alkyl or allyl (—$(CH_2)$—CH=$CH_2$) or O-allyl (—O—$(CH_2)$—CH=$CH_2$) or (poly)alkylene oxide (—$(CR_{27}H—CH_2—O—)_sR_{28}$ ((where s=1-1000), where $R_{27}$ and $R_{28}$ may each independently be H or alkyl or OH or O-alkyl or allyl (—$(CH_2)$—CH=$CH_2$) or O-allyl (—O—$(CH_2)$—CH=$CH_2$); preferably H or methyl, where $R_{26}$ may be H or alkyl or allyl (—$(CH_2)$—CH=$CH_2$) or (poly)alkylene oxide (—$(CR_{27}H—CH_2—O—)_sR_{28}$ ((where s=1-1000), where $R_{27}$ and $R_{28}$ may each independently be H or alkyl or OH or O-alkyl or allyl (—$(CH_2)$—CH=$CH_2$) or O-allyl (—O—$(CH_2)$—CH=$CH_2$); preferably H or methyl;

r may be 1-1000;

or

H or alkyl or OH or O-alkyl or allyl (—$(CH_2)$—CH=$CH_2$) or O-allyl (—O—$(CH_2)$—CH=$CH_2$).

$R_1$ to $R_6$ may each independently be H or alkyl (—$(CH_2)_n$CH_3$ (n=0-20 or OH or O-alkyl or allyl (—$(CH_2)$—CH=$CH_2$) or O-allyl (—O—$(CH_2)$—CH=$CH_2$) or also branching points of the structure $$\{—Si(R_1)(R_6)—O—[Si(R_2)(X)—O]_n—[Si(R_3)(Y)—O]_m—Si(R_4)(R_5)—Z \quad (Ve)$$

having the same possible moieties as in the overstructure.

n is 0-1000 preferably 0-500 more preferably 1-100,
m is 1-100 preferably 1-50 more preferably 1-10.

Copolymers of propylene oxide, butylene oxide or styrene oxide and ethylene oxide are, for example, polymers of general formula (VI):

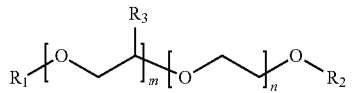
(VI)

$R_1$ may be H or alkyl or allyl (—($CH_2$)—CH=$CH_2$) or alkyl ester, preferably H or alkyl more preferably H.

$R_2$ may be H or alkyl or allyl (—($CH_2$)—CH=$CH_2$) or alkyl ester, preferably H or alkyl more preferably alkyl.

$R_3$ may be H, methyl, ethyl or phenyl, preferably methyl.

n and m may each independently be 1-1000 preferably 1-50 more preferably 1-5.

Block copolymers of propylene oxide and ethylene oxide are polymers of the general structure:

AB; BA; ABA; BAB; ABAB; BABA; ABABA; BABAB, AABB, BBAA; AABBAA, BBAABB and further regular sequences of repeat units A and B, of which repeat unit A is described for example using general formula (VII):

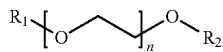
(VII)

$R_1$ and $R_2$ may each independently be repeat unit A or B or H, alkyl or OH or allyl (—($CH_2$)—CH=$CH_2$) or alkyl ester, n may be 0-1000 preferably 1-50 more preferably 1-5.

Repeat unit B is described for example using general formula (VIIa):

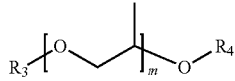
(VIIa)

$R_3$ and $R_4$ may each independently be repeat unit A or B or H, alkyl or OH or allyl (—($CH_2$)—CH=$CH_2$) or alkyl ester, m may be 0-1000 preferably 1-50 more preferably 1-5.

Polyalkylene oxide-poly(meth)acrylate copolymers are, for example, polymers of general formula (VIII):

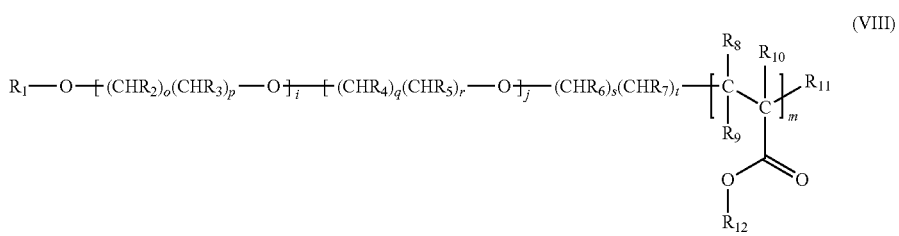
(VIII)

$R_1$ to $R_7$ may each independently be H or alkyl or OH or O-alkyl or allyl (—($CH_2$)—CH=$CH_2$) or O-allyl (—O—($CH_2$)—CH=$CH_2$) or alkyl ester, i and m may each independently be 1-1000, j may be 0-1000, s and t may each independently be 0-10, preferably 0-6, o, p, q and r may each independently be 1-10, preferably 1-5, more preferably 1, $R_8$ and $R_9$ may each independently be H or F, $R_{10}$ may be H or F or methyl, $R_{11}$ may be H or F or alkyl or OH or O-alkyl or allyl (—($CH_2$)—CH=$CH_2$) or O-allyl (—O—($CH_2$)—CH=$CH_2$) or (poly)alkylene oxide (—($CR_{13}H$—$CH_2$—O—)$_n$—$R_{14}$ ((with n=1-1000), where $R_{13}$ and $R_{14}$ may each independently be H or alkyl, or O-alkyl or allyl (—($CH_2$)—CH=$CH_2$) or O-allyl (—O—($CH_2$)—CH=$CH_2$) preferably H, methyl or ethyl or OH, $R_{12}$ may be H or alkyl or branched alkyl (C4-C20) or allyl (—($CH_2$)—CH=$CH_2$) or (poly)alkylene oxide (—($CR_{13}H$—$CH_2$—O—)$_n$—$R_{14}$ ((with n=1-1000), where $R_{13}$ and $R_{14}$ may each independently be H or alkyl, or O-alkyl or allyl (—($CH_2$)—CH=$CH_2$) or O-allyl (—O—($CH_2$)—CH=$CH_2$) preferably H, methyl or ethyl or OH.

Poly(alkylene oxide)-poly((meth)acrylate) block copolymer refers, for example, to polymers of the general structure:

ABA; BAB; ABAB; BABA; ABABA; BABAB, AABB, BBAA; AABBAA, BBAABB and further regular sequences of repeat units A and B, of which repeat unit A for example using general formula (IX)

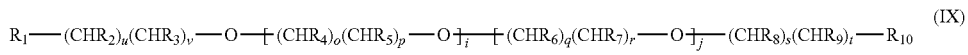
(IX)

where $R_1$ to $R_{10}$ may each independently be repeat unit A or B or H or alkyl or OH or O-alkyl or allyl (—$CH_2$—$CH$=$CH_2$) or O-allyl (—O—($CH_2$)—$CH$=$CH_2$),
i and j may each independently be 0-1000,
s, t, u and v may each independently be 0-10, preferably 0-6,
o, p, q and r may each independently be 1-10, preferably 1-5, more preferably 1.

Repeat unit B is for example signified using general formula (IXa):

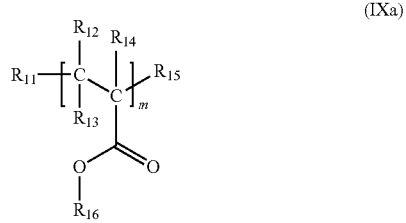
(IXa)

where $R_{12}$ and $R_{13}$ may each independently be H or F, $R_{14}$ may be H or F or methyl,
$R_{11}$ and $R_{15}$ may each be repeat unit A or B or H or F or alkyl or OH or O-alkyl or allyl (—$CH_2$—$CH$=$CH_2$) or O-allyl (—O—($CH_2$)—$CH$=$CH_2$),
$R_{16}$ may be H or alkyl or allyl (—($CH_2$)—$CH$=$CH_2$) or (poly)alkylene oxide (—($CR_{17}H$—$CH_2$—O—)$_n$—$R_{18}$ ((with n=1-1000), where $R_{17}$ and $R_{18}$ may each independently be H or alkyl, or O-alkyl or allyl (—$CH_2$—$CH$=$CH_2$) or O-allyl (—O—($CH_2$)—$CH$=$CH_2$), preferably methyl or ethyl or OH,
m may be 1-1000.

Polyalkylene oxide-(poly)alkyl copolymers are, for example, polymers of general formula (X):

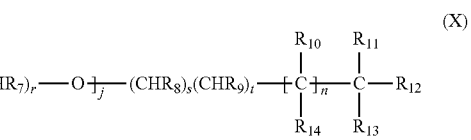
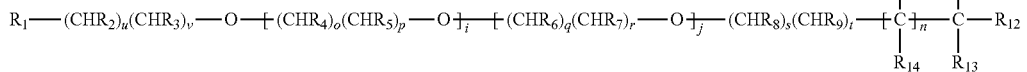
(X)

$R_1$ to $R_9$ may each independently be H or alkyl or OH or O-alkyl or allyl (—($CH_2$)—$CH$=$CH_2$) or O-allyl (—O—($CH_2$)—$CH$=$CH_2$) or alkyl ester,
i and n may each independently be 1-1000,
j may be 0-1000,
s, t, u and v may each independently be 0-10, preferably 0-6,
o, p, q and r may each independently be 1-10, preferably 1-5, more preferably 1.
$R_{10}$ to $R_{14}$ may each independently be H or F or alkyl or OH or O-alkyl or allyl (—($CH_2$)—$CH$=$CH_2$) or O-allyl (—O—($CH_2$)—$CH$=$CH_2$).

(Fluorinated) alkyl ester-polyalkylene oxide copolymers are, for example, polymers of general formula (XI):

$R_1$ to $R_9$ may each independently be H or alkyl or OH or O-alkyl or allyl (—($CH_2$)—$CH$=$CH_2$) or O-allyl (—O—($CH_2$)—$CH$=$CH_2$) or alkyl ester,
i may be 1-1000,
j may be 0-1000,
s, t, u and v may each independently be 0-20, preferably 0-12,
o, p, q and r may each independently be 1-10, preferably 1-5, more preferably 1.
$R_{10}$ to $R_{12}$ may each independently be H or F or alkyl or OH or O-alkyl or allyl (—($CH_2$)—$CH$=$CH_2$) or O-allyl (—O—($CH_2$)—$CH$=$CH_2$),
n may be 1-20,
m may be 1-1000.

Highly branched polyalkylene oxides are, for example, polymers as described in EP 1 141 083, in DE 102 11 664, in WO 00/56802, in WO 03/062306, in WO 96/19537, in WO 03/54204, in WO 03/93343, in WO 05/037893, in WO 04/020503, in DE 10 2004 026 904, in WO 99/16810, in WO 05/026234 and DE 10 2005 009 166.

The swell-seed comprises 60 to 99.9 wt %, preferably 60 to 80 wt %, of at least one nonionic ethylenically unsaturated monomer and 0.1 to 40 wt %, preferably 20 to 40 wt %, of an ethylenically unsaturated hydrophilic monomer.

The average particle size in the unswollen state of the core stage polymer, comprising seed and swell-seed, is in the range from 50 to 300 nm and preferably in the range from 50 to 200 nm.

The nonionic ethylenically unsaturated monomers of the swell-seed are for example styrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth)acrylate, hydroxypropyl (meth)acrylate, glycidyl (meth)acrylate, preferably methyl methacrylate.

The ethylenically unsaturated hydrophilic monomers of the swell-seed are for example acrylic acid, methacrylic acid, acryloyloxypropionic acid, methacryloyloxypropionic

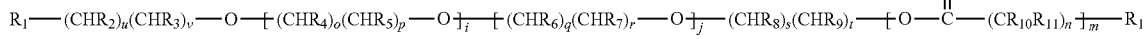
(XI)

acid, acryloyloxy acetic acid, methacryloyloxyacetic acid, crotonic acid, aconitic acid, itaconic acid, monomethyl maleate, maleic acid, monomethyl itaconate, maleic anhydride, fumaric acid, monomethyl fumarate, itaconic anhydride, and also linseed oil fatty acids, such as oleic acid, linoleic acid and linolenic acid and also further fatty acids, such as ricinoleic acid, palmitoleic acid, elaidic acid, vaccenic acid, icosenic acid, cetoleic acid, erucic acid, nervonic acid, arachidonic acid, timnodonic acid, clupanodonic acid, preferably acrylic acid and methacrylic acid.

The sheath stage polymer comprises not less than 50 wt % of a nonionic ethylenically unsaturated monomer.

The nonionic ethylenically unsaturated monomers of the sheath stage polymer are for example styrene, ethylvinylbenzene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth)acrylate, hydroxypropyl (meth)acrylate, glycidyl (meth)acrylate, preferably styrene, acrylonitrile, methacrylamide, methacrylate, methyl methacrylate, ethyl acrylate, ethyl methacrylate, butyl acrylate, butyl methacrylate, 2-ethylhexyl acrylate, 2-ethylhexyl methacrylate.

The sheath stage polymer encloses the core stage polymer and in the protonated state has a glass transition temperature, determined by the Fox equation, of between −60° C. and 120° C.

The particle size of core-shell polymer, consisting of core stage and sheath stage polymer in the unswollen state, is in the range from 60 nm to 1000 nm and preferably in the range from 60 to 500 nm.

When the polymerization is carried out in aqueous solution or dilution, the monomers may be wholly or partly neutralized with bases before or during the polymerization. Useful bases include for example alkali metal or alkaline earth metal compounds such as sodium hydroxide, potassium hydroxide, calcium hydroxide, magnesium oxide, sodium carbonate; ammonia; primary, secondary and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine, polyvinylamine or mixtures thereof.

The ethylenically unsaturated hydrophilic monomers used in (i) are preferably not neutralized before or during the polymerization.

The neutralizing step recited under (ii) is effected with one or more of the recited bases to swell the core and subsequently to form the hollow organic particle.

It is preferable to use sodium hydroxide, ammonia, triethanolamine and diethanolamine for the neutralization recited under (ii).

When the step, recited under ii), of neutralizing the resultant particles with a base up to a pH of not less than 7.5 is carried out in the presence of not less than 0.5 wt % of a nonionic ethylenically unsaturated plasticizing monomer, based on the overall weight of the core-shell polymer, it can be effected under the following conditions:
(a) the plasticizing monomer does not homopolymerize,
(b) in the presence of a plasticizing monomer having a ceiling temperature below 181° C., preferably below 95° C.,
(c) after the polymerization has been stopped by admixing an inhibitor or a reducing agent, or
(d) when the overall amount of the initiator is only up to 0.5 wt % of the sheath stage polymer and is admixed either before starting to mix the monomers of the sheath stage polymer or the monomer of the sheath stage polymer is only admixed during the first 50% of the admixture.

The neutralization referred to under ii) can also be effected under conditions where substantial polymerization takes place.

Homopolymerization is to be understood as referring to the polymerization of only one monomer to form one polymer comprising only one repeat unit at a polymerization rate which, under conditions of free-radical emulsion polymerization, corresponds to at least 10% or more of the polymerization rate of styrene under these conditions.

Examples of nonionic ethylenically unsaturated plasticizing monomers which do not exhibit any homopolymerization under conditions where significant free-radical flux is still detectable are maleic anhydride, stilbene and α-methylstyrene.

The nonionic ethylenically unsaturated plasticizing monomers having a ceiling temperature below 181° C., preferably below 95° C., are, for example, α-methylstyrene, esters of 2-phenylacrylic acid/atropic acid (e.g., methyl, ethyl, n-propyl, n-butyl), 2-methyl-2-butene, 2,3-dimethyl-2-butene, 1,1-diphenylethene and methyl 2-tert-butylacrylate, and also further monomers recited in J. Brandrup, E. H. Immergut, Polymer Handbook 3rd Edition, II/316ff.

There are various ways to ensure that there is no significant free-radical flux to polymerize the plasticizing monomer, such as admixing one or more polymerization inhibitors, admixing one or more reducing agents, waiting for a sufficient period until free radicals are no longer present in any noticeable number, ensuring termination, cooling the reactor contents to restrict the reactivity of the free radicals as well as the formation of new free radicals by thermal decomposition, and also combinations thereof.

One preferred way includes admixing one or more polymerization inhibitors such as, for example, N,N-diethylhydroxylamine, N-nitrosodiphenylamine, 2,4-dinitrophenylhydrazine, p-phenylenediamine, phenothiazine, alloocimene, triethyl phosphite, 4-nitrosophenol, 2-nitrophenol, p-aminophenol, 4-hydroxy-TEMPO (also known as 4-hydroxy-2,2,6,6-tetramethylpiperidinyloxy free radical), hydroquinone, p-methoxyhydroquinone, tert-butyl-p-hydroquinone, 2,5-di-tert-butyl-p-hydroquinone, 1,4-naphthalenediol, 4-tert-butyl-1-catechol, copper sulfate, copper nitrate, cresol and phenol.

Typical reducing agents are sulfur compounds having a reducing effect, examples being bisulfites, sulfites, sulfinates, thiosulfates, dithionites and tetrathionates of alkali metals and ammonium compounds and their adducts such as sodium hydroxymethylsulfinates and acetone bisulfites, and also reducing polyhydroxyl compounds such as carbohydrates and derivatives thereof, for example ascorbic acid, isoascorbic acid and salts thereof (e.g. sodium erythrobate).

If used, polymerization inhibitors or reducing agents are added in an amount effective to stop essentially any polymerization, generally 25 to 5000 parts per million ("ppm"), preferably 50 to 3500 ppm, based on the polymer solids. The polymerization inhibitor(s) or reducing agent(s) are preferably added while the multistage polymer is at or below the temperature at which the sheath stage polymer was polymerized.

When (ii) is carried out in the presence of a plasticizing monomer, the term plasticizing monomer is to be understood as meaning for example styrene, α-methylstyrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, esters of 2-phenylacrylic acid/atropic acid (e.g., methyl, ethyl, n-propyl, n-butyl), 2-methyl-2-butene, 2,3-dimethyl-2-butene, 1,1-diphenylethene, 1,2-diphenylethene, methyl 2-tert-butyl acrylate or maleic anhydride. Styrene or α-methylstyrene is preferably used as plasticizing monomer.

Nonionic ethylenically unsaturated plasticizing monomer (iii) can be polymerized with or without admixing further nonionic ethylenically unsaturated monomers after admixing the base.

Further shells likewise comprise one or more than one nonionic ethylenically unsaturated monomer.

The nonionic ethylenically unsaturated monomers are for example styrene, ethylvinylbenzene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, hydroxyl-containing monomers, in particular $C_1$-$C_{10}$ hydroxyalkyl (meth)acrylates, such as hydroxyethyl (meth) acrylate, hydroxypropyl (meth)acrylate, glycidyl (meth) acrylate, preferably styrene, acrylonitrile, methacrylamide, methacrylate, methyl methacrylate, ethyl acrylate, ethyl methacrylate, butyl acrylate, butyl methacrylate, 2-ethylhexyl acrylate, 2-ethylhexyl methacrylate.

When the polymers obtainable according to the present invention are used for painting, the average final particle size should be in the range from 100 to 600 nm, while it should be in the range from 200 to 2500 nm for use in paper and in cosmetics and in the range from 300 to 800 nm for foams.

In a paint, the pigments conventionally employed, specifically $TiO_2$, can be wholly or partly replaced by the polymeric dispersion described herein. Paints of this type typically comprise inter alia water, thickening agent, base, pigment disperser, associative thickener, defoamer, biocide, binder and also film-forming assistant.

The hollow particle dispersion can also be used for similar applications in other coatings consisting of resinous condensation products comprising phenolates and aminoplasts comprising urea-formaldehyde and melamine-formaldehyde, for example. Use is similarly possible in further coatings based on water-dispersible alkyds, polyurethanes, polyesters, ethyl-vinyl acetates and also styrene-butadiene.

Using the organic pigments obtainable by the method of the present invention in paper coatings leads to an increase in paper gloss. This is attributable to the sheath which, unlike with inorganic pigments, is deformable under pressure. Paper print quality is also enhanced. Substituting the organic pigments described herein with inorganic pigments leads to a lower density for the coating and thus to paper of lighter weight.

In cosmetics, the organic pigments obtainable by the method of the present invention can be used for example in suncreams to boost the level of photoprotection. The extraordinary light-scattering properties serve to increase the probability of UV radiation being absorbed by UV-active substances in the suncream.

The organic pigments obtainable by the method of the present invention may further be used in foams, crop protection agents, thermoplastic molding compounds and liquid inks.

The polymers are obtainable via customary methods of emulsion polymerization. It is preferable to operate in the absence of oxygen, more preferably in a stream of nitrogen. Customary apparatus is employed for the polymerization procedure, examples being stirred tanks, stirred-tank cascades, autoclaves, tubular reactors and kneaders. The polymerization can be carried out in solvent or diluent media, e.g., toluene, o-xylene, p-xylene, cumene, chlorobenzene, ethylbenzene, technical-grade mixtures of alkyl aromatics, cyclohexane, technical-grade aliphatics mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures such as, for example, isopropanol-water mixtures.

The polymerization can be carried out at temperatures of 20 to 300, preferably of 50 to 200° C.

The polymerization is preferably carried out in the presence of compounds that form free radicals. These compounds are needed in a proportion of up to 30, preferably 0.05 to 15, more preferably 0.1 to 5 wt %, based on the monomers used in the polymerization. In the case of multicomponent initiator systems (e.g., redox initiator systems), the foregoing weight particulars are based on total components.

Useful polymerization initiators include, for example, peroxides, hydroperoxides, peroxodisulfates, percarbonates, peroxyesters, hydrogen peroxide and azo compounds. Examples of initiators, which can be water soluble or else water insoluble, are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethyl hexanoate, tert-butyl perbenzoate, lithium peroxodisulfate, sodium peroxodisulfate, potassium peroxodisulfate, ammonium peroxodisulfate, azodiisobutyronitrile, 2,2'-azobis(2-amidinopropane) dihydrochloride, 2-(carbamoylazo) isobutyronitrile and 4,4-azobis(4-cyanovaleric acid).

The initiators may be used alone or mixed with each or one another, for example mixtures of hydrogen peroxide and sodium peroxodisulfate. Polymerization in an aqueous medium preferably utilizes water-soluble initiators.

The familiar redox initiator systems can also be used as polymerization initiators. Redox initiator systems of this type comprise one or more than one peroxide-containing compound combined with a redox co-initiator, e.g., sulfur compounds having a reducing effect, examples being bisulfites, sulfites, sulfinates, thiosulfates, dithionites and tetrathionates of alkali metals and ammonium compounds and their adducts such as sodium hydroxymethylsulfinates and acetone bisulfites and also ascorbic acid, isoascorbic acid and sodium erythrobate. Combinations of peroxodisulfates with alkali metal or ammonium hydrogensulfites can accordingly be used, an example being ammonium peroxodisulfate combined with ammonium disulfite. The ratio of peroxide-containing compound to redox co-initiator is in the range from 30:1 to 0.05:1.

Transition metal catalysts may additionally be used in combination with the initiators and/or the redox initiator systems, examples being salts of iron, cobalt, nickel, copper, vanadium and manganese. Useful salts include, for example, iron(II) sulfate, cobalt(II) chloride, nickel(II) sulfate, copper (I) chloride or else water-soluble iron-chelate complexes such as K[Fe(III)EDTA] or Na[Fe(III)-EDTA]. Based on the monomers to be polymerized or the monomers to be polymerized in any one stage, the reducing transition metal salt is used in a concentration of 0.1 ppm to 1000 ppm. Combinations of hydrogen peroxide with iron(II) salts can accordingly be used, an example being 0.5 to 30% of hydrogen peroxide being combined with 0.1 to 500 ppm of Mohr's salt.

Similarly, polymerization in organic solvents may combine the abovementioned initiators with redox co-initiators and/or transition metal catalysts, examples being benzoin, dimethylaniline, ascorbic acid and also organosoluble complexes of heavy metals, such as copper, cobalt, iron, manganese, nickel and chromium. The customarily used amounts of redox co-initiators and/or transition metal catalysts are here customarily about 0.1 to 1000 ppm, based on the amounts of monomers used.

When the reaction mixture is incipiently polymerized at the lower limit of the temperature range for the polymerization and subsequently fully polymerized at a higher temperature, it is advantageous to use two or more different initiators or intitiator systems that decompose at different temperatures, so an adequate concentration of free radicals is available within every temperature interval, or to use a redox initiator system wherein the peroxide-containing component is initially activated by a co-initiator at a low temperature and thermally decomposes at a higher temperature without a continued need for co-initiator.

The initiator can also be added in stages, and/or the rate of initiator addition varied over time.

To obtain polymers of low average molecular weight, it is often advantageous to conduct the copolymerization in the presence of chain transfer agents. The chain transfer agents used for this may be customary chain transfer agents, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$-$C_4$ aldehydes, such as formaldehyde, acetaldehyde, propionaldehyde, hydroxylammonium salts such as hydroxylammonium sulfate, formic acid, sodium bisulfite, hypophosphorous acid and/or salts thereof, or isopropanol. Chain transfer agents are generally used in amounts of 0.1 to 20 wt %, based on the monomers. The choice of a suitable solvent is another way to control the average molecular weight. Thus, polymerization in the presence of diluents having benzylic hydrogen atoms, or in the presence of secondary alcohols such as, for example, isopropanol, leads to a reduction in the average molecular weight through chain transfer.

Polymers of low or comparatively low molecular weight are also obtained through: varying the temperature and/or the initiator concentration and/or the monomer feed rate.

To obtain comparatively high molecular weight copolymers, it is often advantageous to perform the polymerization in the presence of crosslinkers. These crosslinkers are compounds having two or more ethylenically unsaturated groups, for example diacrylates or dimethacrylates of at least dihydric saturated alcohols, e.g., ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. The acrylic and methacrylic esters of alcohols having more than 2 OH groups can also be used as crosslinkers, examples being trimethylolpropane triacrylate or trimethylolpropane trimethacrylate. A further class of crosslinkers comprises diacrylates or dimethacrylates of polyethylene glycols or polypropylene glycols having molecular weights of 200 to 9000 in each case. Polyethylene and/or polypropylene glycols used for preparing the diacrylates or dimethacrylates preferably have a molecular weight of 400 to 2000 each. Not only the homopolymers of ethylene oxide and/or propylene oxide can be used, but also block copolymers of ethylene oxide and propylene oxide, or random copolymers of ethylene oxide and propylene oxide, which comprise a random distribution of the ethylene oxide and propylene oxide units. Similarly, the oligomers of ethylene oxide and/or propylene oxide are useful for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Useful crosslinkers further include vinyl acrylate, vinyl methacrylate, vinyl itaconate, divinyl adipate, butanediol divinyl ether, trimethylolpropane trivinyl ether, allyl acrylate, allyl methacrylate, methylallyl methacrylate, diallyl phthalate, triallyl isocyanurate, pentaerythritol triallyl ether, triallylsucrose, pentaallylsucrose, pentaallylsucrose, methylenebis(meth)-acrylamide, divinylethyleneurea, divinylpropyleneurea, divinylbenzene, divinyldioxane, triallyl cyanurate, tetraallylsilane, tetravinylsilane and bis- or polyacryloylsiloxanes (e.g., Tegomers® from Evonik Industries AG).

Crosslinkers are preferably used in amounts of 0.1 to 70 wt %, based on the monomers to be polymerized in any one stage. Crosslinkers may be added in every stage.

It may further be advantageous to stabilize the monomer droplets and/or polymer particles with interface-active auxiliary materials. Emulsifiers or protective colloids are typically used for this purpose. Anionic, nonionic, cationic and amphoteric emulsifiers can be used. Anionic emulsifiers include, for example, alkylbenzenesulfonic acids, alkaline earth metal alkylbenzenesulfonates, sulfonated fatty acids, sulfonated olefins, sulfonated diphenyl ethers, sulfosuccinates, fatty alcohol sulfates, alkylphenol sulfates, alkyl polyglycol ether sulfates, fatty alcohol ether sulfates, fatty alcohol phosphates, alkylphenol phosphates, alkyl polyglycol ether phosphates, alkyl polyalkylene oxide phosphates, and fatty alcohol ether phosphates. Useful nonionic emulsifiers include, for example, alkylphenol ethoxylates, primary alcohol ethoxylates, fatty acid ethoxylates, alkanolamide ethoxylates and fatty amine ethoxylates. Useful cationic and/or amphoteric emulsifiers include for example: quaternized aminoalkoxylates, alkylbetaines, alkylamidobetaines and sulfobetaines.

Typical protective colloids include, for example, cellulose derivatives, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid and/or maleic anhydride containing copolymers as described for example in DE 2 501 123. Preference is given to using alkaline earth metal alkylbenzenesulfonates and alkyl polyglycol ether sulfates.

Emulsifiers or protective colloids are customarily used in concentrations of 0.05 to 20 wt %, based on the monomers to be polymerized or to be more precise on the monomers to be polymerized in any one stage. The polymerization may be carried out in a batch or continuous manner in any one of a multiplicity of versions. Customarily, some of the monomer is initially charged, optionally in a suitable diluent or solvent and optionally in the presence of an emulsifier, of a protective colloid or of further auxiliary materials, inertized and heated to the desired polymerization temperature. However, the initial charge may also merely comprise a suitable diluent. The free-radical initiator, further monomer and other auxiliary materials, e.g., chain transfer agents or crosslinkers, are each optionally added within a defined period of time in a diluent. Feed times may be chosen to differ in length. For instance, a longer feed time may be chosen for the initiator feed than for the monomer feed.

When the polymer is produced in a steam-volatile solvent or solvent mixture, the solvent may be removed by introduction of steam in order that an aqueous solution or dispersion may be obtained in this way. The polymer may also be separated from the organic diluent via a drying operation.

The method of the present invention delivers a distinctly higher scattering efficiency in paints and hence a distinct improvement in whiteness. It also provides particles having a distinctly larger voidage. The whiteness of the polymer particles is above 70, preferably above 79.

The present invention further provides for the use of the polymer dispersions obtainable according to the present invention in paints, paper coatings, foams, crop protection agents, liquid inks, thermoplastic molding compounds and cosmetic compositions, preferably in paints.

The present invention further provides a paint in the form of an aqueous composition comprising
  at least one emulsion polymer particle according to the present invention, as defined above,
  at least one filming polymer,
  optionally (in)organic fillers and/or optionally further (in)organic pigments,
  optionally at least one customary auxiliary, and
  water.

Optionally useful filming polymers include aqueous emulsion polymers based on purely acrylate polymers and/or styrene-acrylate polymers, and also any further filming polymers for coatings consisting of resinous condensation products comprising phenolates and aminoplasts and also comprising urea-formaldehyde and melamine-formaldehyde. It is similarly possible to use further polymers based on water-dispersible alkyds, polyurethanes, polyesters, ethyl-vinyl acetates and also styrene-butadiene.

Suitable fillers in clearcoat systems include, for example, matting agents to thus substantially reduce gloss in a desired manner. Matting agents are generally transparent and may be not only organic but also inorganic. Inorganic fillers based on silica are most suitable and are widely available commercially. Examples are the Syloid® brands of W.R. Grace & Company and the Acematt® brands of Evonik Industries AG. Organic matting agents are for example available from BYK-Chemie GmbH under the Ceraflour® and the Ceramat® brands, from Deuteron GmbH under the Deuteron MK® brand. Suitable fillers for emulsion paints further include aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. The preference in paints is naturally for finely divided fillers. The fillers can be used as individual components. In practice, however, filler mixtures have been found to be particularly advantageous, examples being calcium carbonate/kaolin and calcium carbonate/talc. Gloss paints generally include only minimal amounts of very finely divided fillers or contain no fillers at all.

Finely divided fillers can also be used to enhance the hiding power and/or to economize on white pigments. Blends of fillers and color pigments are preferably used to control the hiding power of the hue and of the depth of shade.

Suitable pigments include, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate) or colored pigments, for example iron oxides, carbon black, graphite, zinc yellow, zinc green, ultramarine, manganese black, antimony black, manganese violet, Prussian blue or Parisian green. In addition to inorganic pigments, the emulsion paints of the present invention may also comprise organic color pigments, for example sepia, gambog, Cassel brown, toluidine red, parared, Hansa yellow, indigo, azo dyes, anthraquinoid and indigoid dyes and also dioxazine, quinacridone, phthalocyanine, isoindolinone and metal-complex pigments. Also useful are the Luconyl® brands from BASF SE, e.g., Lyconyl® yellow, Luconyl® brown and Luconyl® red, especially the transparent versions.

Customary auxiliaries include wetting or dispersing agents, such as sodium polyphosphate, potassium polyphosphate, ammonium polyphosphate, alkali metal and ammonium salts of acrylic acid copolymers or of maleic anhydride copolymers, polyphosphonates, such as sodium 1-hydroxyethane-1,1-diphosphonate and also naphthalenesulfonic acid salts, in particular their sodium salts.

More importance attaches to the film-forming assistants, the thickeners and defoamers. Suitable film-forming assistants include, for example, Texanol® from Eastman Chemicals and the glycol ethers and esters as are commercially available for example from BASF SE, under the names Solvenon® and Lusolvan®, and from Dow Chemicals under the tradename Dowanol®. The amount is preferably <10 wt % and more preferably <5 wt %, based on overall formulation. It is also possible to formulate entirely without solvents.

Suitable auxiliaries further include flow control agents, defoamers, biocides and thickeners. Useful thickeners include, for example, associative thickeners, such as polyurethane thickeners. The amount of thickener is preferably less than 2.5 wt %, more preferably less than 1.5 wt % of thickener, based on paint solids content. Further directions regarding the formulation of wood paints are described at length in "Water-Based Acrylates for Decorative Coatings" by the authors M. Schwartz and R. Baumstark, ISBN 3-87870-726-6.

The paint of the present invention can be applied to substrates in a conventional manner, e.g., by brushing, spraying, dipping, rolling or knifecoating.

The examples which follow are offered by way of elucidation, not limitation, of the present invention.

Experimental Methods
Determination of Glass Transition Temperature

Glass transition temperatures were determined by theoretical computation as per the Fox equation (John Wiley & Sons Ltd., Baffins Lane, Chichester, England, 1997), where for polymers having carboxylic acid groups the glass transition temperature in the protonated state was used.

$$1/Tg = W_a/T_{ga} + W_b/T_{gb}, \text{ where}$$

$T_{ga}$ and $T_{gb}$=glass transition temperature of polymers "a" and "b"
$W_a$ and $W_b$=weight fraction of polymers "a" and "b"

Measurement of Particle Size

Particle sizes were determined here and in the accompanying claims by hydrodynamic fractionation using a Polymer Labs particle size distribution analyzer (PSDA). The Cartridge PL0850-1020 column used was operated with a flow rate of 2 ml·min$^{-1}$. The samples were diluted with eluent solution down to an absorption of 0.03 AU·µl$^{-1}$.

The sample is eluted by the size exclusion principle according to the hydrodynamic diameter.

The eluent comprises 0.2 wt % of dodecylpoly(ethylene glycol ether)$_{23}$, 0.05 wt % of sodium dodecylsulfonate, 0.02 wt % of sodium dihydrogen phosphate and 0.02 wt % of sodium azide in deionized water. The pH is 5.8. The elution time is calibrated with polystyrene calibration lattices. The measurement range extends from 20 nm to 1200 nm. Detection is by UV detector at wavelength 254 nm.

Particle size can further be determined using a Coulter M4+ Particle Analyzer or by photon correlation spectroscopy also known as quasi-elastic light scattering or dynamic light scattering (DIN ISO 13321:2004-10) using a Malvern high performance particle sizer (HPPS).

Procedure for Whiteness Measurement

A 6 g quantity of the hereinbelow described color paste and 0.312 g based on solids of the hollow particle dispersion are weighed out into a vessel, the mixture is homogenized without stirring air thereinto. A 200 µm knife coater is used to draw down a film of this mixture on a black polymeric foil (matte option, article No. 13.41 EG 870934001, Bernd Schwegmann GmbH & Co. KG, D) at a speed of 0.9 cm/sec. The samples are dried at 23° C. and a relative humidity of 40-50% for 24 h. Subsequently, a Minolta CM-508i spectrophotometer is used to measure the whiteness (L value from L a b color space in accordance with 11664-4:2012-06) at three different points. The points where the measurements were carried out are marked in order that a micrometer screw may subsequently be used to determine the corresponding thicknesses of the colored-film layer by differential measurement relative to the uncoated polymeric foil. After computing an average film thickness and also an average whiteness from the three individual measurements, the whiteness level obtained is finally standardized to a dry film thickness of 50 µm by linear extrapolation. The calibration needed for this was done by measuring the whiteness of a standard hollow particle dispersion in a dry film thickness range of about 30-60 µm.

Preparation of Color Paste

A vessel is initially charged with 185 g of water and subsequently with the following ingredients, added in the stated order under a dissolver at about 1000 rpm and stirred for altogether about 15 minutes to homogeneity:

2 g of 20 wt % aqueous sodium hydroxide solution, 12 g of Pigmentverteiler® MD 20 pigment disperser (copolymer of maleic acid and diisobutylene from BASF SE), 6 g of Agitan® E 255 (siloxane defoamer from Münzing Chemie GmbH), 725 g of Acronal® A 684 (binder, 50 wt % dispersion from BASF SE), 40 g of Texanol® (film-forming assistant from Eastman Chemical Company), 4 g of Agitan® E 255 (siloxane defoamer from Münzing Chemie GmbH), 25 g of DSX® 3000 (30 wt %, associative thickener: hydrophobic modified polyether (HMPE) from BASF SE) and 2 g of DSX® 3801 (45 wt %, associative thickener: hydrophobic modified ethoxylated urethane (HEUR) from BASF SE).

EXAMPLES

Production of Core-shell Particles:

Organic raw materials not in the form of an aqueous solution were all purified by distillation prior to synthesis.

Example 1

Dispersion B1 (Swell-core):

The initial charge, consisting of 526 g of water, in a polymerization vessel equipped with an anchor stirrer, a reflux condenser and two feed vessels was heated in a nitrogen atmosphere to a temperature of 82° C. After admixing a solution of 76 g of water, 1.69 g of Disponil® FES 993 (alkyl polyglycol ether sulfates (30 wt %)) and 10.96 of EFKA® 3031 (solvent-free, polysiloxane-polyalkylene oxide graft copolymers of comb structure, BASF SE) and waiting for the temperature of the solution to return to 82° C., pre-emulsion 1 (consisting of 15.62 g of water, 0.28 g of Disponil® FES 993, 28.66 g of methyl methacrylate and 0.34 g of methacrylic acid) and 11.43 g of a 10 wt % aqueous sodium peroxodisulfate solution were admixed in succession before polymerizing for 30 min during which the temperature within the polymerization vessel was adjusted to 85° C. Thereafter, pre-emulsion 2 (consisting of 236 g of water, 18.63 g of Disponil® FES 993, 250 g of methyl methacrylate and 144.31 g of methacrylic acid) was metered in at 85° C. over 120 min. Finally, the feed vessel was rinsed with 10 g of water and polymerization was continued for a further 15 min.
solids content: 33.2%
pH: 3.6
particle size (PSDA, volume median): 124 nm
glass transition temperature core stage polymer: 123° C.

Dispersion C1

The initial charge, consisting of 451 g of water and 94.4 g of dispersion B1, in a polymerization vessel equipped with an anchor stirrer, reflux condenser and two feed vessels was heated in a nitrogen atmosphere to a temperature of 78° C., admixed with 16.67 g of a 2.5 wt % aqueous sodium peroxodisulfate solution and then incipiently polymerized for 5 min. At this point the metered addition over 60 min was commenced of pre-emulsion 1 (consisting of 28.3 g of water, 2.22 g of Disponil® LDBS 20 (sodium dodecylbenzenesulfonate (20 wt %)), 3.56 g of methacrylic acid, 23.15 g of methyl methacrylate and 32.6 g of styrene), together with 33.34 g of a 2.5 wt % aqueous sodium peroxodisulfate solution, at an internal temperature which was initially 78° C., but was raised to 80° C. during the addition. On completion of the additions the metered addition over 120 min was commenced of pre-emulsion 2 (consisting of 97.72 g of water, 4.48 g of Disponil® LDBS 20, 1.78 g of linseed oil fatty acid, 0.87 g of allyl methacrylate and 303.42 g of styrene), together with 8.34 g of a 2.5 wt % aqueous sodium peroxodisulfate solution, at an internal temperature which was initially 80° C., but was raised to 82° C. during the addition. On completion of the additions, the internal temperature was raised to 93° C. and the system was stirred for 15 min before admixing 16.67 g of α-methylstyrene. After a further 40 min of stirring, the temperature was lowered to 87° C. On reaching the temperature, the system was stirred for 15 min before the metered addition over 30 min of 209.55 g of a 1.6 wt % aqueous ammonia solution. After a renewed 15-minute period of subsequent stirring, the addition over 30 min was commenced of pre-emulsion 3, consisting of 47 g of water, 0.83 g of Disponil® LDBS 20 and 34.82 g of styrene. Completion of the addition was followed five minutes later by the admixture of 8.04 g of a 10 wt % aqueous solution of tert-butyl hydroperoxide together with 19 g of water and the metered addition over 60 min of 32.5 g of a 3.25 wt % aqueous Rongalit C® solution.
solids content: 29.4%
pH: 9.3
particle size (Autosizer): 351 nm
whiteness: 81
glass transition temperature sheath stage polymer: 110° C.

Comparative Example 1

Dispersion BV1 (Swell-Core)

The initial charge, consisting of 526 g of water, in a polymerization vessel equipped with an anchor stirrer, a reflux condenser and two feed vessels was heated in a nitrogen atmosphere to a temperature of 82° C. After admixing a solution of 76 g of water and 1.69 g of Disponil® FES 993 and waiting for the temperature of the solution to return to 82° C., pre-emulsion 1 (consisting of 15.62 g of water, 0.28 g of Disponil® FES 993, 28.66 g of methyl methacrylate and 0.34 g of methacrylic acid) and 11.43 g of a 10 wt % aqueous sodium peroxodisulfate solution were admixed in succession before polymerizing for 30 min during which the temperature within the polymerization vessel was adjusted to 85° C. Thereafter, pre-emulsion 2 (consisting of 236 g of water, 18.63 g of Disponil® FES 993, 250 g of methyl methacrylate and 144.31 g of methacrylic acid) was metered in at 85° C. over 120 min. Finally, the feed vessel was rinsed with 10 g of water and polymerization was continued for a further 15 min.
solids content: 33.3%
pH: 3.6
particle size (Autosizer): 121 nm
glass transition temperature core stage polymer: 123° C.
Dispersion CV1

The initial charge, consisting of 451 g of water and 94.4 g of dispersion BV1, in a polymerization vessel equipped with an anchor stirrer, reflux condenser and two feed vessels was heated in a nitrogen atmosphere to a temperature of 78° C., admixed with 16.67 g of a 2.5 wt % aqueous sodium peroxodisulfate solution and then incipiently polymerized for 5 min. At this point the metered addition over 60 min was commenced of pre-emulsion 1 (consisting of 28.3 g of water, 2.22 g of Disponil® LDBS 20, 3.56 g of methacrylic acid, 23.15 g of methyl methacrylate and 32.6 g of styrene), together with 33.34 g of a 2.5 wt % aqueous sodium peroxodisulfate solution, at an internal temperature which was initially 78° C., but was raised to 80° C. during the addition. On completion of the additions the metered addition over 120 min was commenced of pre-emulsion 2 (consisting of 97.72 g of water, 4.48 g of Disponil® LDBS 20, 1.78 g of linseed oil fatty acid, 0.87 g of allyl methacrylate and 303.42 g of styrene), together with 8.34 g of a 2.5 wt % sodium peroxodisulfate solution, at an internal temperature which was initially 80° C., but was raised to 82° C. during the addition. On completion of the additions, the internal temperature was raised to 93° C. and the system was stirred for 15 min before admixing 16.67 g of α-methylstyrene. After a further 40 min of stirring, the temperature was lowered to 87° C. On reaching the temperature, the system was stirred for 15 min before the metered addition over 30 min of 209.55 g of a 1.6 wt % aqueous ammonia solution. After a renewed 15-minute period of stirring, the addition over 30 min was commenced of pre-emulsion 3, consisting of 47 g of water, 0.83 g of Disponil® LDBS 20 and 34.82 g of styrene. Completion of the addition was followed five minutes later by the admixture of 8.04 g of a 10 wt % aqueous solution of tert-butyl hydroperoxide together with 19 g of water and the metered addition over 60 min of 32.5 g of a 3.25 wt % aqueous Rongalit C® solution.
solids content: 29.0%
pH: 9.6
particle size (Autosizer): 351 nm
whiteness: 31
glass transition temperature sheath stage polymer: 110° C.

Example 2

Dispersion B2 (Swell-core)

The initial charge, consisting of 521 g of water, 1.64 g of Disponil® FES 993 and 13.27 of EFKA 3031, in a polymerization vessel equipped with an anchor stirrer, a reflux condenser and two feed vessels was heated in a nitrogen atmosphere to a temperature of 82° C. This was followed by admixing pre-emulsion 1 (consisting of 80.68 g of water, 0.27 g of Disponil® FES 993, 27.88 g of methyl methacrylate and 0.33 g of methacrylic acid) and 15.88 g of a 7 wt % aqueous sodium peroxodisulfate solution and polymerization for 30 min during which the temperature within the polymerization vessel was adjusted to 85° C. This was followed by the metered addition over 120 min of pre-emulsion 2 (consisting of 485.67 g of water, 27.22 g of Disponil® FES 993, 332.32 g of methyl methacrylate, 0.9 g of allyl methacrylate and 228.82 g of methacrylic acid), at 85° C. The feed line was subsequently rinsed with 450.16 g of water. Completion of the addition was followed fifteen minutes later by the concurrent metered addition over 75 min of 133.35 g of a 1.5 wt % aqueous sodium peroxodisulfate solution, of a mixture of 89.33 g of n-butyl methacrylate and 498.33 g of methyl methacrylate, and also of a solution of 3.59 g of Disponil® LDBS 20 and 12.07 g methacrylic acid in 700 g of water. Finally, the feed vessel was rinsed with 48 g of water and the system was polymerized for a further 30 min.
solids content: 33.1%
pH: 2.9
particle size (PSDA, volume median): 188 nm
glass transition temperature core stage polymer: 123° C.
Dispersion C2:

The initial charge, consisting of 354 g of water and 180 g of dispersion B2, in a polymerization vessel equipped with an anchor stirrer, a reflux condenser and two feed vessels was heated in a nitrogen atmosphere to a temperature of 81° C. Addition of 25.2 g of a 1.4 wt % aqueous sodium peroxodisulfate solution was followed by the metered addition over 120 min of pre-emulsion 1, consisting of 102 g of water, 13.6 g of Disponil® LDBS 20, 2 g of linseed oil fatty acids, 17.2 g of methyl methacrylate, 10.88 g of acrylonitrile, 3.4 g of allyl methacrylate and 206.92 g of styrene, together with 24.32 g of a 2.5 wt % aqueous sodium peroxodisulfate solution. On completion of the additions, 3.36 g of a 2.5 wt % aqueous sodium peroxodisulfate solution were added and the internal temperature was raised to 92° C. over 40 min. Then, 23.76 g of α-methylstyrene were added over 10 min. After a further 20 min of stirring 219.28 g of a 3 wt % aqueous sodium hydroxide solution were metered in over 20 min and stirred in for 5 min. This was followed by the metered addition within 15 min of pre-emulsion 2, consisting of 40.44 g of water, 7 g of Disponil® LDBS 20, 0.28 g of methacrylic acid and 78 g of styrene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.
solids content: 29.5%
pH: 8.9
particle size (PSDA, volume median): 398 nm
whiteness: 80
glass transition temperature sheath stage polymer: 111° C.

Comparative Example 2

Seed Dispersion AV1

A pre-emulsion was prepared from 123.85 g of water, 0.35 g of Disponil® FES 993, 182 g of n-butyl acrylate, 163.45 g of methyl methacrylate and 4.55 g of methacrylic acid. The initial charge, consisting of 1190.9 g of water, 24.97 g of Disponil® FES 993 and also 22.19 g of the pre-emulsion, in a polymerization vessel equipped with an anchor stirrer, a reflux condenser and two feed vessels was heated in a nitrogen atmosphere to a temperature of 80° C. and subjected to the start of a polymerization for 15 min after addition of 67.2 g of a 2.5 wt % aqueous sodium peroxodisulfate solution. Thereafter, the rest of the pre-emulsion was metered in at 80° C. over 60 min. This was followed by further polymerization for 15 min and cooling down to 55° C. over 20 min. To deplete the residual monomers, 3.5 g of a 10 wt % aqueous tert-butyl hydroperoxide solution and also 2.19 g of a 10 wt % aqueous Rongalit C solution were then added to the reaction mixture, which was stirred for one hour and then cooled down to 30° C., at which point 4.38 g of 25 wt % aqueous ammonia solution were added to adjust the pH of the dispersion.
solids content: 19.9%
particle size (PSDA, volume median): 50 nm
Dispersion BV2 (Swell-core)

The initial charge, consisting of 1822.6 g of water and 169 g of seed dispersion A2, in a polymerization vessel equipped with an anchor stirrer, reflux condenser and two feed vessels was heated in a nitrogen atmosphere to a temperature of 82° C. Two minutes after addition of 26.68 g of a 7 wt % aqueous sodium peroxodisulfate solution, a mixture of 0.62 g of allyl methacrylate and 217.34 g of methyl methacrylate and a solution of 9.34 g of Lutensit A-EP A, 9.34 g of Disponil® LDBS 20 and 166 g of methacrylic acid in 562 g of water were added concurrently over 90 min. Ten minutes after completion of the addition, 92.55 g of a 1.5 wt % aqueous sodium peroxodisulfate solution, a mixture of 62 g of n-butyl methacrylate and 345.86 g of methyl methacrylate and also a solution of 2.49 g of Disponil® LDBS 20 and 8.38 g of methacrylic acid in 276.89 g of water were added concurrently over 75 min. Finally, the feed vessel was rinsed with 33 g of water and polymerization was continued for a further 30 min.
solids content: 21.9%
pH: 3.5
particle size (PSDA, volume median): 190 nm
glass transition temperature core stage polymer: 104° C.
Dispersion CV2

The initial charge, consisting of 261 g of water and 273.21 g of dispersion BV2, in a polymerization vessel equipped with an anchor stirrer, a reflux condenser and two feed vessels was heated in a nitrogen atmosphere to a temperature of 81° C. Addition of 25.2 g of a 1.4 wt % aqueous sodium peroxodisulfate solution was followed by the metered addition over 120 min of pre-emulsion 1, consisting of 102 g of water, 13.6 g of Disponil® LDBS 20, 2 g of linseed oil fatty acids, 17.2 g of methyl methacrylate, 3.4 g of allyl methacrylate and 217.8 g of styrene, together with 24.32 g of a 2.5 wt % aqueous sodium peroxodisulfate solution. On completion of the additions, 3.36 g of a 2.5 wt % aqueous sodium peroxodisulfate solution were added and the internal temperature was raised to 92° C. over 40 min. Then, 23.76 g of α-methylstyrene were added over 10 min. After a further 20 min of stirring 219.28 g of a 3 wt % aqueous sodium hydroxide solution were metered in over 20 min and stirred in for 5 min. This was followed by the metered addition within 15 min of pre-emulsion 2, consisting of 40.44 g of water, 7 g of Disponil® LDBS 20, 0.28 g of methacrylic acid and 78 g of styrene. Completion of the addition was followed five minutes later by the addition of 5.64 g of a 10 wt % aqueous solution of tert-butyl hydroperoxide and the metering over 20 min of 31 g of a 3 wt % aqueous Rongalit C® solution. 30 minutes after completion of the addition a further 9.16 g of a 10 wt % aqueous solution of tert-butyl hydroperoxide and 8.52 g of a 5.1 wt % aqueous Rongalit C® solution were added concurrently by metered addition over 60 min.
Solids content: 30%
pH: 8.3
Particle size (PSDA, volume median): 400 nm
Whiteness: 40
glass transition temperature sheath stage polymer: 111° C.

Example 3

Dispersion B3 (Swell-core)

The initial charge, consisting of 521 g of water, 1.64 g of Disponil® FES 993 and 13.27 of EFKA 3031, in a polymerization vessel equipped with an anchor stirrer, a reflux condenser and two feed vessels was heated in a nitrogen atmosphere to a temperature of 82° C. This was followed by admixing pre-emulsion 1 (consisting of 80.68 g of water, 0.27 g of Disponil® FES 993, 27.88 g of methyl methacrylate and 0.33 g of methacrylic acid) and 15.88 g of a 7 wt % aqueous sodium peroxodisulfate solution and polymerization for 30 min during which the temperature within the polymerization vessel was adjusted to 85° C. This was followed by the metered addition over 120 min of pre-emulsion 2 (consisting of 485.67 g of water, 27.22 g of Disponil® FES 993, 333.22 g of methyl methacrylate and 228.82 g of methacrylic acid), at 85° C. The feed line was subsequently rinsed with 450.16 g of water. Completion of the addition was followed fifteen minutes later by the concurrent metered addition over 75 min of 133.35 g of a 1.5 wt % aqueous sodium peroxodisulfate solution, of a mixture of 89.33 g of n-butyl methacrylate and 498.33 g of methyl methacrylate, and also of a solution of 3.59 g of Disponil® LDBS 20 and 12.07 g methacrylic acid in 700 g of water. Finally, the feed vessel was rinsed with 48 g of water and the system was polymerized for a further 30 min.
solids content: 33.3%
pH: 2.9
particle size (PSDA, volume median): 176 nm
glass transition temperature core stage polymer: 123° C.

Dispersion C3:

The initial charge, consisting of 379.4 g of water and 180.6 g of dispersion B3 from Example 2, in a polymerization vessel equipped with an anchor stirrer, reflux condenser and two feed vessels was heated in a nitrogen atmosphere to a temperature of 81° C. Admixture of 56 g of a 2.5 wt % aqeuous sodium peroxodisulfate solution was followed by the metered addition over 90 min of pre-emulsion 1 (consisting of 200 g of water, 8 g of Disponil® LDBS 20, 4 g of methacrylic acid, 2 g of allyl methacrylate and 266.4 g of styrene) together with 16 g of a 2.5 wt % aqueous sodium peroxodisulfate solution. On completion of the additions the internal temperature was raised to 92° C. over 20 min. Then 12 g of a 10 wt % aqueous Rongalit C® solution were added and stirred in for 5 min to stop the polymerization. Subsequent addition of 36 g of a 10 wt % aqueous ammonia solution, which was likewise stirred in for 5 min, was followed by the metered addition over 30 min of pre-emulsion 2 (consisting of 40 g of water, 12 g of Disponil® LDBS 20 and 68 g of styrene). On completion of the addition the dispersion was cooled down to 85° C. over 15 min. This was followed by the metered addition over 40 min of 12 g of a 10 wt % aqueous tert-butyl hydroxide solution. On completion of the addition a further 9.14 g of a 10 wt % aqueous solution of tert-butyl hydroperoxide and 9.16 g of a 4.8 wt % aqueous Rongalit C® solution were metered in concurrently over 60 min.

solids content: 30.1% pH: 9.3 particle size (PSDA, volume mode): 386 nm whiteness: 80.6 glass transition temperature sheath stage polymer: 108° C.

Comparative Example 3

Dispersion CV3

The initial charge, consisting of 289 g of water and 271 g of dispersion BV2 from Comparative Example 2, in a polymerization vessel equipped with an anchor stirrer, reflux condenser and two feed vessels was heated in a nitrogen atmosphere to a temperature of 81° C. Admixture of 56 g of a 2.5 wt % aqueous sodium peroxodisulfate solution was followed by the metered addition over 90 min of pre-emulsion 1 (consisting of 200 g of water, 8 g of Disponil® LDBS 20, 4 g of methacrylic acid, 2 g of allyl methacrylate and 266.4 g of styrene) together with 16 g of a 2.5 wt % aqueous sodium peroxodisulfate solution. On completion of the additions the internal temperature was raised to 92° C. over 20 min. Then 12 g of a 10 wt % aqueous Rongalit C® solution were added and stirred in for 5 min to stop the polymerization. Subsequent addition of 36 g of a 10 wt % ammonia solution, which was likewise stirred in for 5 min, was followed by the metered addition over 30 min of pre-emulsion 2 (consisting of 40 g of water, 12 g of Disponil® LDBS 20 and 68 g of styrene). On completion of the addition the dispersion was cooled down to 85° C. over 15 min. This was followed by the metered addition over 40 min of 12 g of a 10 wt % aqueous tert-butyl hydroxide solution. On completion of the addition a further 9.14 g of a 10 wt % aqueous solution of tert-butyl hydroperoxide and 9.16 g of a 4.8 wt % aqueous Rongalit C® solution were metered in concurrently over 60 min.

solids content: 30.3% pH: 9.2 particle size (PSDA, volume median): 395 nm whiteness: 40 glass transition temperature sheath stage polymer: 108° C.

Example 4

Dispersion B4 (Swell-core)

The initial charge, consisting of 782 g of water, in a polymerization vessel equipped with an anchor stirrer, a reflux condenser and two feed vessels was heated in a nitrogen atmosphere to a temperature of 82° C. After admixing a solution of 260.2 g of water, 3.29 g of Disponil® FES 993 and 26.52 of EFKA 3031 and waiting for the temperature of the solution to return to 82° C., pre-emulsion 1 (consisting of 161.2 g of water, 0.55 g of Disponil® FES 993, 55.73 g of methyl methacrylate and 0.66 g of methacrylic acid) and 31.75 g of a 10 wt % aqueous sodium peroxodisulfate solution were admixed in succession before polymerizing for 30 min during which the temperature within the polymerization vessel was adjusted to 85° C. Thereafter, pre-emulsion 2 (consisting of 971 g of water, 0.55 g of Disponil® FES 993, 725 g of methyl methacrylate and 418.6 g of methacrylic acid) was metered in at 85° C. over 120 min. Finally, the feed vessel was rinsed with 262 g of water and polymerization was continued for a further 15 min.

solids content: 33.4% pH: 3.8 particle size (PSDA, volume median): 147 nm glass transition temperature core stage polymer: 123° C.

Dispersion C4

The initial charge, consisting of 430.43 g of water and 76.88 g of dispersion B4, in a polymerization vessel equipped with an anchor stirrer, a reflux condenser and two feed vessels was heated in a nitrogen atmosphere to a temperature of 81° C. This was followed by the metered addition over 60 min of 32.46 g of a 3.2 wt % aqueous sodium peroxodisulfate solution. Concurrently, initially 9.44 g of pre-emulsion 1 (consisting of 21.4 g of water, 0.63 g of Rhodacal DS-10 (sodium dodecylbenzenesulfonate (15 wt %)) 20, 3.76 g of methacrylic acid, 25.16 g of methyl methacrylate and 25.16 g of styrene) were added over 15 min. Then the remaining 66.67 g of pre-emulsion 1 were added over 45 min, so the initiator feed and the feed of pre-emulsion 1 end coterminously. Completion of the additions was followed 30 min later by the metered addition of pre-emulsion 2 (consisting of 114 g of water, 3.36 g of Rhodacal DS-10, 1.26 g of linseed oil fatty acid, 5.03 g of methacrylic acid, 0.5 g of allyl methacrylate and 251.8 g of styrene) over 70 min during which the internal temperature was raised to 92° C. On completion of the addition the internal temperature was lowered to 89° C. over 20 min. This was followed by the admixture of pre-emulsion 3 (consisting of 40 g of water, 0.84 g of Rhodacal DS-10 and 62.92 g of styrene). After a stirring time of 15 min, 221.5 g of a 2.5 wt % aqueous sodium hydroxide solution were metered in over 60 min. The end of the addition was followed 15 min later by the admixture of 12 g of an 8.33 wt % aqueous solution of tert-butyl hydroperoxide together with 14 g of a 7.1 wt % aqueous Rongalit C® solution and a further 10 min of polymerization.

solids content: 30.1 pH: 8.5 particle size (PSDA, volume median): 391 whiteness: 81 glass transition temperature sheath stage polymer: 108° C.

Comparative Example 4

Seed Dispersion AV2:

A pre-emulsion was prepared from 123.85 g of water, 0.88 g of Disponil® LDBS 20, 182 g of n-butyl acrylate, 163.45 g of methyl methacrylate and 4.55 g of methacrylic acid. The initial charge, consisting of 1190.9 g of water, 24.97 g of Disponil® FES 993 and also 22.19 g of the pre-emulsion, in a polymerization vessel equipped with an anchor stirrer, a reflux condenser and two feed vessels was heated in a nitrogen atmosphere to a temperature of 80° C. and subjected to the start of a polymerization for 15 min after addition of 67.2 g of a 2.5 wt % aqueous sodium peroxodisulfate solution. Thereafter, the rest of the pre-emulsion was metered in at 80° C. over 60 min. This was followed by further polymerization for 15 min and cooling down to 55° C. over 20 min. To deplete the residual monomers, 3.5 g of a 10 wt % aqueous tert-butyl hydroperoxide solution and also 2.19 g of a 10 wt % aqueous Rongalit C solution were then added to the reaction mixture, which was stirred for one hour and then cooled down to 30° C., at which point 4.38 g of 25 wt % aqueous ammonia solution were added to adjust the pH of the dispersion.
solids content: 19.8%
particle size (PSDA, volume median): 34 nm Dispersion BV3:

The initial charge, consisting of 401.5 g of water, 22.51 g of seed dispersion AV2 and 5.5 g of Disolvine E-FE6 (iron-EDTA chelate complex (1 wt %), in a polymerization vessel equipped with an anchor stirrer, reflux condenser and two feed vessels was heated in a nitrogen atmosphere to a temperature of 82° C. This was followed by the admixture of 15.95 g of a 10 wt % aqueous tert-butyl hydroxide solution and of 7.54 g of a 2.1 wt % aqueous ascorbic acid solution. Admixture was followed ten minutes later by the concurrent metered addition over 90 min of 357.5 g of methyl methacrylate and of a solution of 8.25 g of Disponil® FES 993 and 192.5 g of methacrylic acid in 715 g of water. In addition, 67.82 g of a 2.1 wt % aqueous ascorbic acid were metered in concurrently over 120 min. Completion of the addition was followed by a rinse of the feed vessel with 35 g of water and a further 10 min of polymerization.
solids content: 33.4%
pH: 3.8
particle size (PSDA, volume median): 147 nm
glass transition temperature core stage polymer: 122° C.

Dispersion CV4

The initial charge, consisting of 425 g of water and 82.31 g of dispersion BV3, in a polymerization vessel equipped with an anchor stirrer, a reflux condenser and two feed vessels was heated in a nitrogen atmosphere to a temperature of 81° C. This was followed by the metered addition over 60 min of 32.46 g of a 3.2 wt % aqueous sodium peroxodisulfate solution. Concurrently, initially 9.44 g of pre-emulsion 1 (consisting of 21.4 g of water, 0.63 g of Rhodacal DS-10 20, 3.76 g of methacrylic acid, 25.16 g of methyl methacrylate and 25.16 g of styrene) were added over 15 min. Then the remaining 66.67 g of pre-emulsion 1 were added over 45 min, so the initiator feed and the feed of pre-emulsion 1 end coterminously. Completion of the additions was followed 30 min later by the metered addition of pre-emulsion 2 (consisting of 114 g of water, 3.36 g of Rhodacal DS-10, 1.26 g of linseed oil fatty acid, 5.03 g of methacrylic acid, 0.5 g of allyl methacrylate and 251.8 g of styrene) over 70 min during which the internal temperature was raised to 92° C. On completion of the addition the internal temperature was lowered to 89° C. over 20 min. This was followed by the admixture of pre-emulsion 3 (consisting of 40 g of water, 0.84 g of Rhodacal DS-10 and 62.92 g of styrene). After a stirring time of 15 min, 221.5 g of a 2.5 wt % aqueous sodium hydroxide solution were metered in over 60 min. The end of the addition was followed 15 min later by the admixture of 12 g of an 8.33 wt % aqueous solution of tert-butyl hydroperoxide together with 14 g of a 7.1 wt % aqueous Rongalit C® solution and a further 10 min of polymerization.
solids content: 29.9
pH: 8.7
particle size (PSDA, volume median): 412 nm
whiteness: 42
glass transition temperature sheath stage polymer: 108° C.

We claim:
1. A method for producing emulsion polymer particles, the method comprising:
   (i) performing a sequential polymerization to obtain a multistaged emulsion polymer in the form of particles;
   ii) neutralizing the particles with at least one base to a pH of not less than 7.5; and
   iii) optionally polymerizing further shells comprising one or more nonionic ethylenically unsaturated monomer, wherein:
   the multistaged emulsion polymer comprises at least a core stage polymer and a sheath stage polymer;
   the core stage polymer comprises:
      from 5 to 99.5 wt %, based on the weight of the core stage polymer, of at least one hydrophilic ethylenically unsaturated monomer,
      from 0 to 95 wt %, based on the weight of the core stage polymer, of at least one nonionic ethylenically unsaturated monomer, and
      0.5 to 20 wt % of at least one nonionic polyalkylene oxide containing additive, based on the weight of the core stage polymer;
   the sheath stage polymer comprises not less than 50 wt % of a nonionic ethylenically unsaturated monomer, and
   the emulsion polymer particles produced have a whiteness above 79.

2. The method according to claim 1, wherein the nonionic polyalkylene oxide containing additive is selected from the group consisting of a polysiloxane-polyalkylene oxide copolymers, branched polysiloxane-polyalkylene oxide copolymers, polysiloxane-polyalkylene oxide graft copolymers having polyester, (fluorinated) (poly)alkyl, polyacrylate side chains; copolymers of propylene oxide and ethylene oxide, block copolymers of propylene oxide and ethylene oxide, polyalkylene oxide-poly(meth)acrylate copolymers, polyalkylene oxide-(poly)alkyl copolymers, poly(alkylene oxide)-poly((meth)acrylate) block copolymer, fluorinated alkyl ester polyalkylene oxides and polyalkoxylates and highly branched polyalkylene oxides.

3. The method according to claim 1, wherein the nonionic polyalkylene oxide containing additive is admixed in amounts of 1 to 5 wt % of at least one nonionic polyalkylene oxide containing additive based on the weight of the core stage polymer.

4. The method according to claim 1, wherein the average particle size in the unswollen state of the core stage polymer, comprising seed and swell-seed, is in the range from 50 to 300 nm.

5. The method according to claim 1, wherein the glass transition temperature, determined by the Fox equation, of the core stage polymer in the protonated state is between −20° C. and 150° C.

6. The method according to claim 1, wherein the sheath stage polymer in the protonated state has a glass transition temperature, determined by the Fox equation, of between −60° C. to 120° C.

7. The method according to claim 1, wherein the particle size of the core shell polymer in the unswollen state is in the range from 60 nm to 1000 nm.

8. The method according to claim 1, wherein the neutralizing occurs with one or more bases selected from the group consisting of alkali metal or alkaline earth metal compounds, ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine, polyvinylamine and mixtures thereof.

9. The method according to claim 1, wherein the core stage polymer comprises methacrylic acid, methyl methacrylate, n-butyl methacrylate, allyl methacrylate, and a polysiloxane-polyalkylene oxide graft copolymer having a comb structure.

10. A method for producing emulsion polymer particles, the method comprising:
(i) performing a sequential polymerization to obtain a multistaged emulsion polymer in the form of particles;
ii) neutralizing the particles with at least one base to a pH of not less than 7.5, in the presence of not less than 0.5 wt % of a nonionic ethylenically unsaturated plasticizing monomer, based on the overall weight of the core-shell polymer;
iii) subsequently polymerizing the nonionic ethylenically unsaturated plasticizing monomer optionally by further admixing one or more nonionic ethylenically unsaturated monomer; and
iv) optionally polymerizing further shells comprising one or more nonionic ethylenically unsaturated monomer,
wherein:
the multistaged emulsion polymer comprises at least a core stage polymer and a sheath stage polymer;
the core stage polymer comprises:
from 5 to 99.5 wt %, based on the weight of the core stage polymer, of a hydrophilic ethylenically unsaturated monomer,
from 0 to 95 wt %, based on the weight of the core stage polymer, of at least one nonionic ethylenically unsaturated monomer, and
0.5 to 20 wt % of at least one nonionic polyalkylene oxide containing additive, based on the weight of the core stage polymer;
the sheath stage polymer comprises by way of polymerized units not less than 50 wt % of a nonionic ethylenically unsaturated monomer, and
the emulsion polymer particles produced have a whiteness above 79.

11. The method according to claim 10, wherein the neutralizing ii) occurs under one of the following conditions (a-d):
(a) the plasticizing monomer does not homopolymerize,
(b) in the presence of a plasticizing monomer having a ceiling temperature below 181° C.,
(c) after the polymerization has been stopped by admixing an inhibitor or a reducing agent, or
(d) when the overall amount of the initiator is only up to 0.5 wt % of the sheath stage polymer and is admixed either before starting to mix the monomers of the sheath stage polymer or is only admixed during the first 50% of the monomer admixture of the sheath stage polymer.

12. The method according to claim 10, wherein the plasticizing monomer is selected from the group consisting of styrene, α-methylstyrene, vinyltoluene, ethylene, butadiene, vinyl acetate, vinyl chloride, vinylidene chloride, acrylonitrile, acrylamide, methacrylamide, ($C_1$-$C_{20}$)alkyl or ($C_3$-$C_{20}$)alkenyl esters of acrylic or methacrylic acid, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, esters of 2-phenylacrylic acid/atropic acid (e.g., methyl, ethyl, n-propyl, n-butyl), 2-methyl-2-butene, 2,3-dimethyl-2-butene, 1,1-diphenylethene, 1,2-diphenylethene, methyl 2-tert-butyl-acrylate and maleic anhydride.

13. The method according to claim 10, wherein the nonionic ethylenically unsaturated plasticizing monomer is maleic anhydride, stilbene or α-methylstyrene.

14. The method according to claim 10, wherein the nonionic ethylenically unsaturated plasticizing monomer is selected from the group consisting of α-methylstyrene, esters of 2-phenylacrylic acid/atropic acid, 2-methyl-2-butene, 2,3-dimethyl-2-butene, 1,1-diphenylethene and methyl 2-tert-butylacrylate.

15. The method according to claim 10, wherein the core stage polymer comprises methacrylic acid, methyl methacrylate, n-butyl methacrylate, allyl methacrylate, and a polysiloxane-polyalkylene oxide graft copolymer having a comb structure.

16. A method for producing emulsion polymer particles, the method comprising:
(i) performing a sequential polymerization to obtain a multistaged emulsion polymer in the form of particles;
ii) neutralizing the particles with at least one base up to a pH of not less than 7.5; and
iii) optionally polymerizing further shells comprising one or more nonionic ethylenically unsaturated monomer,
wherein:
the multistaged emulsion polymer comprises at least a core stage polymer and a sheath stage polymer;
the core stage polymer comprises:
from 5 to 99.5 wt %, based on the weight of the core stage polymer, of at least one hydrophilic ethylenically unsaturated monomer,
from 0 to 95 wt %, based on the weight of the core stage polymer, of at least one nonionic ethylenically unsaturated monomer, and
0.5 to 20 wt % of at least one nonionic polyalkylene oxide containing additive, based on the weight of the core stage polymer; and
the sheath stage polymer comprises not less than 50 wt % of a nonionic ethylenically unsaturated monomer,
wherein the nonionic polyalkylene oxide containing additive is selected from the group consisting of polysiloxane-polyalkylene oxide graft copolymers of comb structure, polysiloxane-polyalkylene oxide graft copolymers of α,ω structure or mixtures thereof.

17. The method according to claim 16, wherein the nonionic polyalkylene oxide containing additive is a polysiloxane-polyalkylene oxide graft copolymers of comb structure of formula (I):

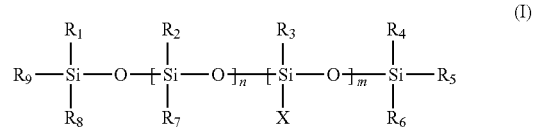

where
R1 to R9 are independently H or alkyl (—$(CH_2)_n CH_3$ (n=0-20)) or OH or O-alkyl (—O—$(CH_2)_n CH_3$ (n=0-20)) or allyl (—$(CH_2)$—CH=$CH_2$) or O-allyl(—O—$(CH_2)$—CH=$CH_2$) or phenyl or alkyl ester
n is 0-1000,
m is 1-100, X is the following structure:
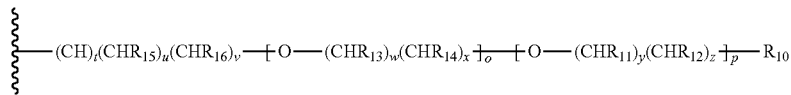
where
R10 is OH or O-alkyl ($-O-CH_2)_nCH_3$ (n=0-20)) or O-allyl ($-O-(CH_2)-CH=CH_2$) or O-phenyl or an alkyl ester
R11 to R16 may each independently be H or alkyl ($-(CH_2)_nCH_3$ (n=0-20)) or phenyl,
o is 0-100,
p is 1-100,
t is 0 or 2,
u is 0-10,
v is 0-10,
w, x, y, z may each be independently 1-10 and the same or different.
* * * * *

UNITED STATES PATENT AND TRADEMARK OFFICE
CERTIFICATE OF CORRECTION

| | |
|---|---|
| PATENT NO. | : 10,377,914 B2 |
| APPLICATION NO. | : 14/913555 |
| DATED | : August 13, 2019 |
| INVENTOR(S) | : Daniel Kehrloesser et al. |

It is certified that error appears in the above-identified patent and that said Letters Patent is hereby corrected as shown below:

On the Title Page

Column 2, item (56), Foreign Patent Documents, Line 4, "10 2005 009 1" should read -- 10 2005 009 166 A1 --.

In the Specification

Column 3, Line 50, "$C_1$-$C_7$alkyl," should read -- $C_1$-$C_7$-alkyl, --.

Column 9, Line 53, "x,y" should read -- w,x,y --.

Column 19, Line 40, "intitiator" should read -- initiator --.

Column 22, Line 41, "Lyconyl®" should read -- Luconyl® --.

Column 29, Line 7, "aqeuous" should read -- aqueous --.

In the Claims

Column 34, Line 47, Claim 16, "α,ωstructure" should read -- α,ω structure --.

Signed and Sealed this
Thirty-first Day of March, 2020

Andrei Iancu
*Director of the United States Patent and Trademark Office*